US 6,707,519 B1

(12) United States Patent
Okumura et al.

(10) Patent No.: US 6,707,519 B1
(45) Date of Patent: Mar. 16, 2004

(54) THREE STATE TRANSFLECTIVE LIQUID CRYSTAL DISPLAY

(75) Inventors: Osamu Okumura, Chino (JP); Tsuyoshi Maeda, Yamanashi-ken (JP); Eiji Okamoto, Matsumoto (JP); Takumi Seki, Misato-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/402,555

(22) PCT Filed: Jan. 26, 1999

(86) PCT No.: PCT/JP99/00318

§ 371 (c)(1),
(2), (4) Date: Oct. 4, 1999

(87) PCT Pub. No.: WO99/40480

PCT Pub. Date: Aug. 12, 1999

(30) Foreign Application Priority Data

Feb. 4, 1998 (JP) .......................... 10-023656
Aug. 28, 1998 (JP) .......................... 10-243823

(51) Int. Cl.⁷ .......................... G02F 1/1335
(52) U.S. Cl. .......................... 349/114; 349/62; 349/98; 349/112; 349/115; 349/119
(58) Field of Search .......................... 349/114, 62, 98, 349/115, 117, 119, 112

(56) References Cited

U.S. PATENT DOCUMENTS

| 4,398,805 A | * | 8/1983 | Cole | 349/114 |
| 5,841,494 A | * | 11/1998 | Hall | 349/98 |
| 6,008,871 A | * | 12/1999 | Okumura | 349/61 |
| 6,195,140 B1 | * | 2/2001 | Kubo et al. | 349/44 |
| 6,271,901 B1 | * | 8/2001 | Ide et al. | 349/96 |
| 6,285,422 B1 | * | 9/2001 | Maeda et al. | 349/96 |

FOREIGN PATENT DOCUMENTS

| JP | 58-24122 | 2/1983 |
| JP | 03-137619 | 6/1991 |
| JP | 04-282613 A | 7/1992 |
| JP | 05-011281 | 1/1993 |
| JP | 06-194656 | 7/1994 |
| JP | 07-043719 | 2/1995 |
| JP | 7-318929 | 8/1995 |
| JP | 07-234414 | 9/1995 |
| JP | 08-076125 | 3/1996 |
| JP | 08-086912 | 4/1996 |
| JP | 8292413 | * 11/1996 |
| JP | 8-292413 | 11/1996 |
| JP | 08-292413 | 11/1996 |
| JP | 09-043609 | 2/1997 |
| JP | 09-123337 | 5/1997 |
| JP | 09-160061 | 6/1997 |
| JP | 09-211476 | 8/1997 |
| JP | 11-095240 | 4/1999 |

* cited by examiner

Primary Examiner—Julie Ngo
(74) Attorney, Agent, or Firm—Harness, Dickey & Pierce, P.L.C.

(57) ABSTRACT

A liquid crystal device of the present invention performs transmissive display using light from an illumination devices 111 and 112 in a dark environment, and reflective display using light reflected by a transflective layer 123 provided on the inner side of a liquid crystal cell in a bright environment. A retardation plate is provided adjacent to a polarizer 109 and an illumination device so that the rotational direction of polarization of the light emitted from the illumination device is the same as that of the polarization of the light reflected by the transflective layer in a dark display state.

26 Claims, 20 Drawing Sheets

| ANGLE θ | ELLIPTICITY | CONTRAST | BRIGHTNESS |
|---|---|---|---|
| 51.5 | 0.78 | 6.5 | 4.1% |
| 50.5 | 0.81 | 7.6 | 4.0% |
| 49.5 | 0.84 | 8.1 | 3.9% |
| 48.5 | 0.87 | 9 | 3.8% |
| 47.5 | 0.90 | 9.8 | 3.6% |
| 46.5 | 0.93 | 10.4 | 3.5% |
| 45.5 | 0.97 | 10.9 | 3.3% |
| 44.5 | 1.00 | 11.3 | 3.1% |
| 43.5 | 0.97 | 10.6 | 2.9% |

*Fig. 14*

THREE STATE TRANSFLECTIVE LIQUID CRYSTAL DISPLAY

BACKGROUND OF THE INVENTION

1. Technical Field

The present invention relates to a liquid crystal device, and particularly to a transflective liquid crystal device having both the reflective display function of performing display by reflecting light, which is incident on a liquid crystal layer from a front side of liquid crystal cell, by a transflective layer, and the transmissive display function of performing display by transmitting light, which is incident on the liquid crystal layer from a back side, through the transflective layer. The present invention also relates to an electronic apparatus using the liquid crystal device.

2. Background Art

Although a reflective liquid crystal device is generally used for the display unit of a portable electronic apparatus, it has a problem in that a display cannot be recognized in the dark because of the use of external light incident on a liquid crystal layer from the front side of a liquid crystal cell. Therefore, a transflective liquid crystal device has been proposed in which a display can be recognized by using external light, like a reflective liquid crystal device, in the light, and using light emitted from an illumination device arranged on the back side of a liquid crystal cell in the dark.

The transflective liquid crystal device comprises a polarizer, a transflector, and the illumination device, which are arranged in this order on the back side of the liquid crystal cell, as disclosed in Japanese Unexamined Utility Model Publication No. 57-49271. In this liquid crystal device, in bright reflective display is performed by reflecting the external light incident on the liquid crystal layer from the front side of the liquid crystal cell by a transflector, and in dark surroundings, transmissive display is performed by transmitting the light emitted from the illumination device through the transflector.

An example of other transflective liquid crystal devices is the transflective liquid crystal device disclosed in Japanese Unexamined Patent Publication No. 8-292413, which is aimed at improving the brightness of reflective display. This transflective liquid crystal device comprises a transflector, a retardation plate, a polarizer, and a back light, which are arranged on the back side of the liquid crystal cell in this order, wherein in light surroundings, external light incident on the liquid crystal layer from the front side of the liquid crystal cell is reflected by the transflector to perform reflective display, and in dark surroundings, the light emitted from the back light is transmitted through the transflector to perform transmissive display. Such a structure produces brighter reflective display than the aforementioned liquid crystal device because no polarizer is present between the liquid crystal cell and the transflector.

However, the transflective liquid crystal device disclosed in the above publication comprises a transparent substrate interposed between the liquid crystal layer and the transflector, and thus causes a double image due to parallax when reflective display is performed. Particularly, a color liquid crystal device comprising a combination of the transflective liquid crystal device disclosed in the above publication and color filters has the high possibility that the color filter through which light incident on the liquid crystal layer from the front side of the liquid crystal cell passes, and the color filter through which the incident light passes after being reflected by the transflector are different, thereby causing the problem of paling a display color.

In order to solve this problem, Japanese Unexamined Patent Publication Nos. 7-318929 and 7-333598 disclose the invention of a transflective liquid crystal device including a transflector arranged in a liquid crystal cell in order to remove parallax.

In the transflective liquid crystal devices disclosed in Japanese Unexamined Patent Publication Nos. 7-318929 and 7-333598, i.e., transflective liquid crystal devices performing reflective display without using the polarizer provided on the back side of the liquid crystal cell, when the light, which is incident from the front side of the liquid crystal cell and passes through the liquid crystal layer is reflected by the transflector, the light is preferably changed to circularly polarized light or elliptically polarized light with high ellipticity in a dark display state, and changed to linearly polarized light or elliptically polarized light with low ellipticity in a bright display state. This is because when circularly polarized light or elliptically polarized light with high ellipticity, which is reflected by the transflector, again passes through the liquid crystal layer, the light is changed to linearly polarized light perpendicular to the transmission axis of the polarizer provided on the front side of the liquid crystal cell or elliptically polarized light with low ellipticity, and absorbed by the polarizer, thereby realizing good contrast properties.

On the other hand, the light transmitted through the transflector from the back side of the liquid crystal cell is constantly in the same polarization state without dependency of the display states.

In the transflective liquid crystal devices disclosed in Japanese Unexamined Patent Publication Nos. 7-318929 and 7-333598, no optical element for changing polarization of the light incident on the liquid crystal layer is provided between the polarizer provided on the back side of the liquid crystal cell and the transflector, and thus linearly polarized light transmitted through the polarizer provided on the back side of the liquid crystal cell is constantly incident on the liquid crystal layer. Therefore, by preferable setting for reflective display in which the light reflected by the transflector is changed to circularly polarized light or elliptically polarized light with high ellipticity in the dark display state, the contrast properties of transmissive display deteriorate.

This is because linearly polarized light incident on the liquid crystal layer from the back side of the liquid crystal cell, in the dark display state, is changed to circularly polarized light or elliptically polarized light with high ellipticity when passing through the liquid crystal layer, and thus part of the light is transmitted through the polarizer provided on the front side of the liquid crystal cell.

SUMMARY OF THE INVENTION

The present invention has been achieved for solving the above problems, and a first object of the invention is to obtain a transflective liquid crystal device exhibiting good contrast properties in transmissive display, and a second object of the invention is to obtain a transflective liquid crystal device causing no double image due to parallax.

In order to achieve the objects, the liquid crystal device according to the present invention has a reflective display function of performing display by reflecting light, which is incident on a liquid crystal layer from one side of liquid crystal cell, by a transflective layer, and the transmissive display function of performing display by transmitting light, which is incident on the liquid crystal layer from the other side opposite to the one side, through the transflective layer. According to the liquid crystal device, a first display state as a bright display state and a second display state as a dark display state can be selected by changing the voltage applied to the liquid crystal layer; and in the second display state, the light incident on the liquid crystal layer from the one side of the liquid crystal cell passes through the liquid crystal layer and is reflected by the transflective layer to be changed to circularly polarized light or elliptically polarized light with the predetermined rotational direction. The liquid crystal device has a first polarizer provided on the one side, and an optical element provided on the other side, for polarizing the light incident on the transflective layer from the other side into a light with a predetermined rotational direction.

In the first liquid crystal device, the transflective layer is a layer for reflecting and transmitting incident light with certain reflectance and transmittance, which is formed by, for example, a commercially available half mirror, a metal film having an aperture, a metal film formed as thin as part of light can be transmitted.

In an embodiment of the first liquid crystal device, reflective display is performed by using light incident on the liquid crystal layer from the one side, i.e., the front side of the liquid crystal cell. In this case, linearly polarized light produced by polarization by the first polarizer is incident on the liquid crystal layer from the front side of the liquid crystal cell, passed through the liquid crystal layer, reflected by the transflective layer, and then again passed through the liquid crystal layer. The light transmitted through the first polarizer is emitted as image light from the front side of the liquid crystal device. In this liquid crystal device, when the quantity of light emitted from the front side of the liquid crystal cell is small, for example, in the dark, transmissive display is performed by using light incident from the other side, i.e., the back of the liquid crystal cell. In this case, the light incident from the other side is transmitted through the transflective layer, and then passes through the liquid crystal layer. The light transmitted through the first polarizer is emitted as image light from the front side of the liquid crystal device.

In the first liquid crystal device, in the dark display state, the light incident from the front side of the liquid crystal cell passes through the liquid crystal layer, and is then reflected by the transflective film to be changed to circularly polarized light or elliptically polarized light with the predetermined rotational direction. The light again passes through the liquid crystal layer to be changed to linearly polarized light in the direction perpendicular to the transmission axis of the first polarizer, or elliptically polarized light with the long axis direction different from the transmission axis of the first polarizer, and is thus absorbed by the first polarizer.

On the other hand, the light incident from the back of the liquid crystal cell is changed by the optical element to light with the predetermined rotational direction, i.e., the same rotational direction as the light incident from the front side of the liquid crystal cell and then is reflected by the transflective layer. Then, the light passes through the transflective layer. In passing through the liquid crystal layer, the light incident from the back of the liquid crystal cell is changed to linearly polarized light perpendicular to the transmission axis of the first polarizer or elliptically polarized light having the long axis direction different from the transmission axis of the first polarizer, and is thus absorbed by the first polarizer.

Namely, in the dark display state, the polarization state of the light emitted from the liquid crystal layer toward the first polarizer in reflective display is the same as or close to that in transmissive display, thereby preventing the contrast of the transmissive display from being decreased due to a difference in polarization state between the both.

In another embodiment of the first liquid crystal device of the present invention, in the aforementioned second display state, the ellipticity in reflection of the light, which is incident on the liquid crystal layer from the one side of the liquid cell and reflected by the transflective layer, is substantially the same as the ellipticity in transmission of the light, which is incident on the liquid crystal layer from the other side of liquid crystal cell and transmitted through the transflective layer.

In this embodiment, in the dark display state, the polarization state of the light emitted from the front side of the liquid crystal cell in reflective display is the same as that in transmissive display, thereby preventing a decrease in the contrast of the transmissive display.

In a further embodiment of the first liquid crystal device of the present invention, a bright display state as a first display state, a dark display state as a second display state, and a medium brightness state is between the first and second states as a third display state can be selected by changing the voltage applied to the liquid crystal layer. In this embodiment, the third display state not only shows the specified brightness but includes a plurality of display states which can be selected according to the voltage applied to the liquid crystal layer.

In this embodiment, the brightness display state, the dark display state, and the medium brightness display state can be selected, thereby permitting so-called halftone display.

In a still further embodiment of the first liquid crystal device, in the second display state, the light incident on the liquid crystal layer from the one side of liquid crystal cell is reflected by the transflective film to be changed to circularly polarized light with the predetermined rotational direction, and in the first display state, the light incident on the liquid crystal layer from the one side of liquid crystal cell is reflected by the transflective film to be changed to linearly polarized light.

In this embodiment, in the second display state, light incident on liquid crystal layer from the the front side of the liquid crystal cell is reflected by the transflective film to be changed to circularly polarized light. The circularly polarized light reflected by the transflective layer passes through the liquid layer again to be changed to linearly polarized light perpendicular to the transmission axis of the first polarizer, which is about 100% absorbed by the first polarizer. On the other hand, in the first display state, the light incident on the liquid crystal layer from the front side of the liquid crystal cell is reflected by the transflective film without a change in the polarization state, again passes through the liquid crystal layer, and then transmitted through the first polarizer. Therefore, reflective display having highest utilization efficiency of light and optimum contrast properties is realized. In this case, when the light incident on the liquid crystal layer from the back side of the liquid crystal cell is transmitted through the transflective layer and circulary polarized, the transmissive display exhibits highest contrast.

In a further embodiment of the first liquid crystal device, the optical element comprises a second polarizer or a reflective polarizer provided on the other side, and a retardation plate provided between the second polarizer or reflective polarizer and the liquid crystal cell. As the second polarizer used in this embodiment, a polarizer having the function to transmit a linearly polarized light component in a certain direction and absorb a linearly polarized light component perpendicular to this direction can be used. As the reflective polarizer, a reflective polarizer having the function to transmit a linearly polarized light component in a certain direction and reflect a linearly polarized light component perpendicular to this direction, can be used. Such a reflective polarizer is disclosed in detail in International Publication No. WO095/01788.

In a further embodiment of the first liquid crystal device, the transmission axis of the polarizer or reflective polarizer, and the axis and retardation value of the retardation plate are set so that when the light incident on the liquid crystal layer from the other side is transmitted through the transflective layer, the ellipticity is 0.85 or more.

In this embodiment, the light incident on the liquid crystal layer from the back of the liquid crystal cell is changed to circularly polarized light or elliptically polarized light with high ellipticity (i.e., close to circularly polarized light), thereby realizing the first liquid crystal device exhibiting higher contrast in the transmissive display.

In a further embodiment of the first liquid crystal device, the retardation plate comprises a 1/4 wavelength plate.

In this embodiment, the retardation plate comprises the 1/4 wavelength plate, and thus the light changed to linearly polarized light by the second polarizer can be incident as completely circularly polarized light on the transflective layer. Japanese Unexamined Patent Publication No. 5-100114 discloses that circularly polarized light can also be obtained by a method using a wide-band circular polarizer comprising a lamination of a 1/2 wavelength plate and a 1/4 wavelength plate, a method using a 3/4 wavelength plate or a 5/4 wavelength plate, or the like. However, according to the latter methods, the wavelength region for good circularly polarized light is narrow, and thus a method using a single 1/4 wavelength plate is preferably used.

In a further embodiment of the first liquid crystal device, a liquid crystal polymer exhibiting a cholesteric phase is used as the optical element. Such a liquid crystal polymer has the function to selectively reflect and transmit circularly polarized light according to its rotational direction. The liquid crystal polymer is disclosed in detail in Japanese Unexamined Patent Publication No. 8-27189.

In a further embodiment of the first liquid crystal device, an illumination device is further provided on the side of the optical element different from the liquid crystal layer side.

In this embodiment, light emitted from the illumination device can be incident on the liquid crystal cell from the back side of the liquid crystal cell, thereby permitting transmissive display by using the light from the illumination device in the use of the liquid crystal device in the dark.

A second liquid crystal device of the present invention comprises a liquid crystal cell having a liquid crystal layer held between a first substrate and a second substrate arranged opposite to the first substrate; a transflective layer arranged on the liquid crystal layer side of the second substrate for reflecting and transmitting incident light with predetermined reflectance and transmittance; an illumination device arranged on the side of the second substrate different from the liquid crystal layer side; a polarizer or reflective polarizer arranged between the liquid crystal cell and the illumination device; and a retardation plate arranged between the polarizer and the liquid crystal cell for changing the linearly polarized light, resulting from the light emitted from the illumination device and then transmitted through the polarizer, to circularly polarized light or elliptically polarized light; wherein the rotational direction of the circularly polarized light or the elliptically polarized light resulting from the light emitted from the illumination device and then transmitted through the retardation plate is the same as that of the circularly polarized light or the elliptically polarized light resulting from the light incident on the liquid crystal layer from the first substrate side and then reflected by the transflector in the dark display state.

The transflective layer used in the second liquid crystal device is a layer reflecting and transmitting light with predetermined reflectance and transmittance, and for example, a metal film having a very narrow slit, a metal thin film, or the like is suitable as the transflector.

In the second liquid crystal device of the present invention, the light emitted from the illumination device and then transmitted through the second polarizer to be changed to linearly polarized light is changed to circularly polarized light or elliptically polarized light by the retardation plate. The rotational direction of the circularly polarized light or elliptically polarized light is the same as the rotational direction of circularly polarized light resulting from the light insident on the liquid crystal layer from the first polarizer side, then passes through the liquid crystal layer in the dark display state and reflected by the transflective layer. Therefore, high contrast properties are realized in transmissive display. Furthermore, since no substrate is interposed between the transflective layer and the liquid crystal layer, there is no problem of a double image due to parallax in reflective display.

In an embodiment of the second liquid crystal device, the transmission axis of the second polarizer or reflective polarizer and the axis and retardation value of the retardation plate are set so that polarized light resulting from the light emitted from the illumination device and then transmitted through the retardation plate has an ellipticity of 0.85 or more.

In another embodiment of the second liquid crystal device, the retardation plate comprises at least one 1/4 wavelength plate. Japanese Unexamined Patent Publication No. 5-100114 discloses that circularly polarized light can also be obtained by a method using a wide-band circular polarizer comprising a lamination of a 1/2 wavelength plate and a 1/4 wavelength plate, a method using a 3/4 wavelength plate or a 5/4 wavelength plate, or the like. However, according to the latter methods the wavelength region for good circularly polarized light is narrow, and thus a method using a single 1/4 wavelength plate is preferably used.

A third liquid crystal device of the present invention comprises a liquid crystal cell having a liquid crystal layer held between a first substrate and a second substrate arranged opposite to the first substrate; a transflector arranged on the liquid crystal layer side of the second substrate for reflecting and transmitting incident light with predetermined reflectance and transmittance; an illumination device arranged on the side of the second substrate different from the liquid crystal side; and a selective reflective layer arranged between the liquid crystal cell and the illumination device for selectively reflecting and transmitting circularly polarized light or elliptically polarized light according to its rotational direction; wherein the rotational direction of the circularly polarized light resulting from the light emitted from the illumination device and then transmitted through the selective reflective layer is the same as that of the circularly polarized light resulting from the light incident on the liquid crystal layer from the first substrate side and then reflected by the transflector, in the dark display.

In the third liquid crystal device of the present invention, of light emitted from the illumination device, circularly polarized light or elliptically polarized light with the predetermined rotational direction is transmitted through the selective reflective layer. The rotational direction of the circularly polarized light or the elliptically polarized light is the same as that of the circularly polarized light or the elliptically polarized light resulting from the light emitted from the first substrate side, then passing through the liquid crystal layer in the dark display state, and reflected by the trasflector. Therefore, high contrast properties are realized in transmissive display. In addition, since no substrate is interposed between the transflective layer and the liquid crystal layer, there is no problem of a double image due to parallax in reflective display. Further, part of the light reflected by the selective reflective layer is also transmitted through the selective reflective layer due to scattering by the surface of the illumination device, thereby increasing the utilization efficiency of light emitted from the illumination device.

In an embodiment of the third liquid crystal device, the selective reflective layer is, for example, a reflective layer which employs the selective reflection of a comprising a cholesteric liquid crystal.

In another embodiment of the third liquid crystal device, the selective reflective layer is a film-shaped circularly polarized light reflector which employs the selective reflection of a cholesteric liquid crystal, and has the function to transmit right-handed circularly polarized light and reflect left-handed circularly polarized light, or transmit left-handed circularly polarized light and reflect right-handed circularly polarized light. Details of such a selective reflective layer are disclosed in Japanese Unexamined Patent Publication No. 8-27189.

An electronic apparatus of the present invention is an electronic apparatus comprising a liquid crystal device as a display unit, wherein the first, second or third liquid crystal device is provided as the liquid crystal device.

In an electronic apparatus comprising the first liquid crystal device, good contrast properties are realized in transmissive display.

In an electronic apparatus comprising the second or third liquid crystal device, good contrast properties are realized, and there is no double image due to parallax, in transmissive display.

In the first, second and third liquid crystal devices of the present invention, the rotational direction of circularly polarized light or elliptically polarized light means the rotational direction of an electric field vector of light. Namely, "left" and "right" in so-called "left-handed polarized light" and "right-handed polarized light" indicate the rotational direction.

In the first, second and third liquid crystal devices of the present invention, the liquid crystal layer in the dark display state represents the liquid crystal layer to which a voltage necessary for obtaining sufficiently dark display is applied. Namely, in normally black display mode, the liquid crystal layer in the dark display state means a liquid crystal layer with no voltage applied or the non-selective voltage applied, while in normally white display mode, it means a liquid crystal layer with the selective voltage applied.

In the first, second and third liquid crystal devices according to the present invention, the objects of the present invention can be achieved as long as the light changed to circularly polarized light or elliptically polarized light is light within the predetermined wavelength range in the visible wavelength region. However, it is preferable that the circularly polarized light or elliptically polarized light with high ellipticity is obtained at the vicinity of the maximum strength wavelength in case that the light emitted from the illumination device is colored light, while the same is obtained at at the green wavelength where the human visibility is highest in case that the light emitted from the illumination device is white light. Of course, it is ideal to obtain uniform circularly polarized light or elliptically polarized light with high ellipticity at all wavelengths over the entire visible wavelength region.

In the first, second and third liquid crystal devices of the present invention, in order to secure a contrast, it is optimum to obtain circularly polarized light, but circularly polarized light is sometimes intentionally shifted to improve the brightness of transmissive display. With an ellipticity of less than 0.85, the contrast of transmissive display is lower than that of reflective display.

The display operation of the liquid crystal device of the present invention will be described in further detail below.

First, description is made on the reason why the light incident from the second polarizer side is changed to circularly polarized light or elliptically polarized light in transmission through the transflector, and the reason why the contrast of transmissive display is increased when the rotational direction of that circularly or elliptically polarized light is the same as the rotational direction of the circularly polarized light or elliptically polarized light resulting from the light incident on the liquid crystal layer from the first polalizer side, then passing through the liquid crystal layer in the dark display state, and reflected by the transflector. Although the description below is made on the assumption that the light incident from the second polarizer side is changed to circularly polarized light in transmission through the transflector, the basic principle is the same when the incident light is changed to elliptically polarized light.

On the basis of FIG. 12, description is made on the fact that in reflective liquid crystal display mode of the single-polarizer type, which is used in the first, second and third liquid crystal devices of the present invention, the light incident from the first polarizer side is changed to circularly polarized light when passing through the liquid crystal layer in the dark display state and then reflected by the transflective surface.

FIG. 12(a) shows a single-polarizer type reflective liquid crystal device. Reference numeral 1201 denotes a polarizer; reference numeral 1202, a reflector; and reference numeral 1211, a liquid crystal layer in the dark display state. Members such as a substrate, an alignment film, a transparent electrode, etc. are not required for describing the operation, and are thus omitted. A retardation plate may be provided between the polarizer and the liquid crystal layer. However, if the retardation plate is considered as a first layer of a liquid crystal layer, the description below is applicable, and thus the retardation plate is also omitted.

In the dark display state, the linearly polarized light incident on the liquid crystal layer from the polarizer 1201 passes forward and backward through the liquid crystal layer 1211 to be changed to linearly polarized light perpendicular to the incident polarized light, and is then absorbed by the polarizer 1201.

FIG. 12(b) shows a structure in which a polarizer 1204 and a liquid crystal layer 1212 are arranged so as to have mirror symmetry to the polarizer 1201 and the liquid crystal layer 1211 with the phantom central plane 1203 held therebetween. The single-polarizer type reflective liquid crystal device shown in FIG. 12(a) is equivalent to the two-polarizer type transmissive liquid crystal device shown in FIG. 12(b). The linearly polarized light incident on the liquid crystal layer from the polarizer 1201 is changed to linearly polarized light perpendicular to the incident light by the liquid crystal layers 1211 and 1212, and then absorbed by the polarizer 1204.

Here a structure is assumed. FIG. 12(c) shows a structure in which the liquid crystal layer 1212 and the polarizer 1204 shown in FIG. 12(b) are rotated 90° to be changed to a liquid crystal layer 1213 and a polarizer 1205, respectively. In this structure, the liquid crystal layers symmetrical across the central plane 1203 held therebetween are perpendicular to each other as long as they are seen from at least the normal of the central plane. Namely, the fast axis and the slow axis are overlapped to compensate for retardation. Therefore, the linearly polarized light incident on the liquid crystal layer from the polarizer 1201 is changed to various types of light by the liquid crystal layers 1211 and 1212, then returned to the initial linearly polarized light, and absorbed by the polarizer 1205 to produce dark display.

If the structure shown in FIG. 12(b) is equivalent to the structure shown in FIG. 12(c), the structure shown in FIG. 12(c) is certainly put into the dark display. A requirement for making both structures equivalent is that the polarization state in the central plane 1203 is not changed even by 90° rotation. The polarization states meeting such requirement are only two, i.e., right-handed circularly polarized light and left-handed circularly polarized light. Therefore, the light passing through the liquid crystal layer in the dark display state is changed to circularly polarized light and reaches the reflection surface.

If the above description is clarified, residual description can easily be made. In FIG. 13, reflective display is performed as described below. Incident light 1311 from the outside is changed to linearly polarized light 1321 when passing through a polarizer 1301. The linearly polarized light is changed to, for example, right-handed circularly polarized light 1322 when passing through a liquid crystal layer in the dark display state, and then reaches a transflector 1302. The right-handed circularly polarized light 1322 is reflected by the transflector 1302 to be changed to left-handed circularly polarized light 1322 with a change in the travel direction of light. The light 1322 again passes through the liquid crystal layer in the dark display state to be changed to linearly polarized light 1323, and then absorbed by the polarizer 1301.

In order to obtain high contrast in the transmissive display, the dark display must be sufficiently dark. Namely, when passing through the transflector, the incident light 1312 from the back is preferably changed to the same left-handed circularly polarized light 1322 as the case of the reflective display.

Conversely, if the incident light 1312 is changed to right-handed circularly polarized light, bright display is produced as negative display in which light and darkness are reverse to the reflective display.

BRIEF DESCRIPTION OF THE DRAWINGS

FIG. 14 shows the contrast properties and brightness of the liquid crystal device in accordance with the first embodiment.

FIG. 15b is a sectional view taken along line B–B' in FIG. 15a.

BEST MODE FOR CARRYING OUT THE INVENTION

Embodiments of the present invention will be described in detail below with reference to the drawings.

Figure 1:
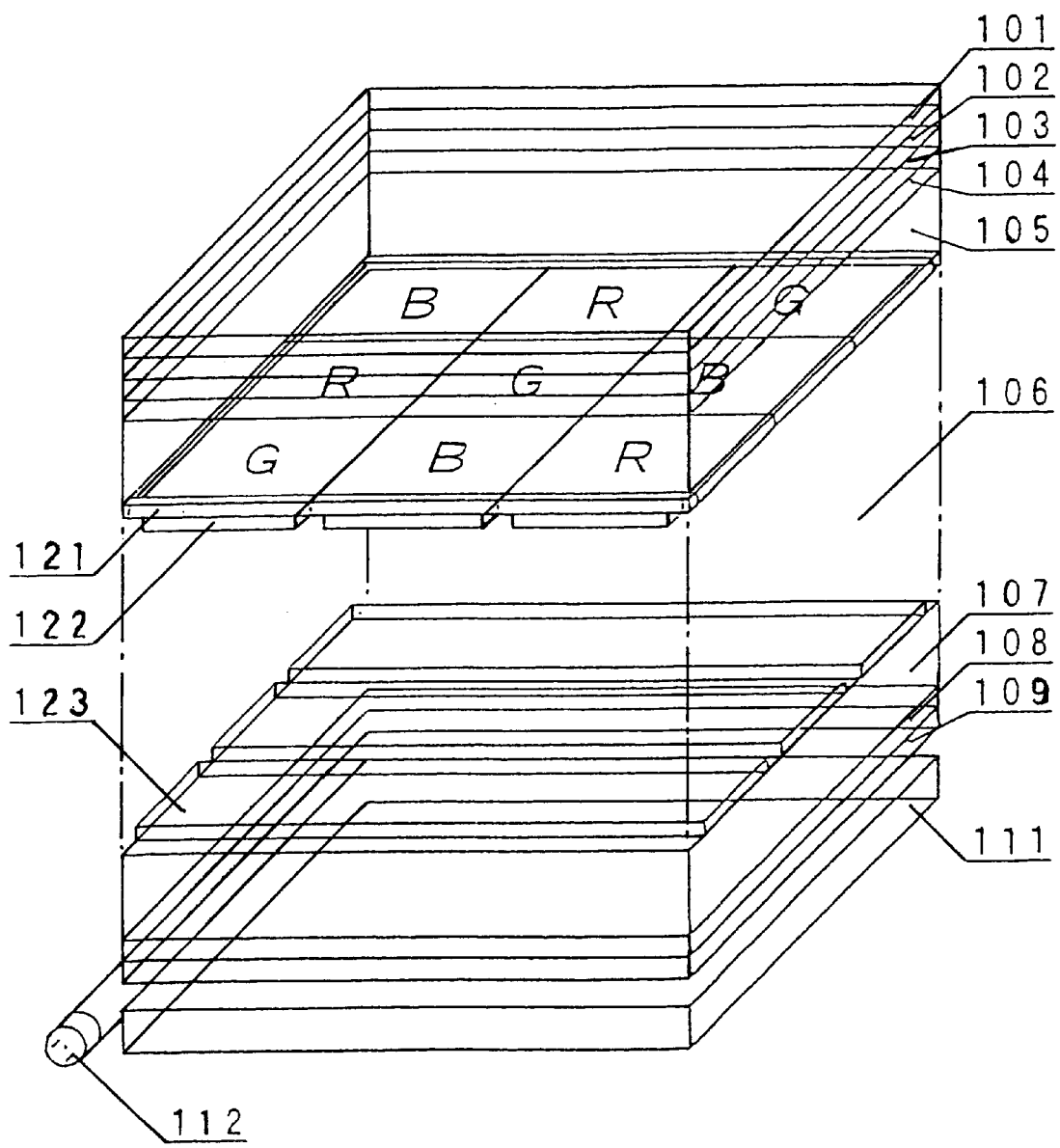
FIG. 1 shows the structure of a liquid crystal device in accordance with first, third, fourth and sixth embodiments and comparative examples.

FIG. 1 is a drawing showing a liquid crystal device of the present invention. A first embodiment is basically related to a passive matrix type liquid crystal device, but the same structure can be applied to an active matrix type liquid crystal device.

The structure of the liquid crystal device is described on the basis of FIG. 1. Reference numeral 101 denotes a first polarizer; reference numeral 102, a first retardation plate; reference numeral 103, a second retardation plate; reference numeral 104, a forward scattering plate; reference numeral 105, a first substrate; reference numeral 106, a liquid crystal layer; reference numeral 107, a second substrate; reference numeral 108, a third retardation plate; reference numeral 109, a second polarizer; reference numeral 111, a light guide; and reference numeral 112, a light source. The light guide 111 and the light source 112 constitute an illumination device. Reference numeral 121 denotes a color filer; reference numeral 122, a scanning electrode; and reference numeral 123, a transflector also serving as a signal electrode. Here the first and second substrates 104 and 106 are widely spaced in order to make clear the drawing, but both substrates are actually opposed to each other with a small gap of several $\mu$m to several tens $\mu$m. Although, as the case may be, elements other than those shown in the drawing, such as a liquid crystal alignment film, upper and lower shortproof films, an over coat film, a spacer ball, a sealing agent, a black mask, an anti-glare film, a liquid crystal driver IC, a driving circuit, etc., are required, these elements are unnecessary for describing the characteristics of the present invention, and are thus omitted here.

Each of the components is described below. The first and second polarizers 101 and 109 have the function to absorb a predetermined linearly polarized light component, and transmit other polarized light components.

Each of the first, second and third retardation plates 102, 103 and 108 comprises a uniaxially oriented film of a polycarbonate resin or polyvinyl alcohol resin. The third retardation plate 108 is an essential element of the present invention, while the first and second retardation plates 102 and 103 are used particularly for compensating for coloring of a STN liquid crystal. Therefore, only one of the first and second retardation plates may be used, or both retardation plates are frequently omitted in the case of a TN liquid crystal.

The forward scattering plate 104 is provided for scattering the mirror reflection of the transflector, and a film comprising two types of small regions having different refractive indexes can be used. Such a structure permits the formation of a light scattering plate having strong forward scattering and low backward scattering. Specifically, a plastic film can be used, in which small beads are dispersed in a transparent binder having a reflective index different from that of the beads. Another plastic film may also be used, in which two types of small regions having different refractive indexes are formed in a layered structure so as to scatter the light incident at the specific angle only.

In order to impart the scattering function without using the forward scattering plate, a scattering layer may be provided in the liquid crystal cell, or the transflector itself may be provided with a scattering structure. As the first and second substrates 105 and 107, a transparent glass substrate is preferable. A plastic substrate can also be used for making the liquid crystal device lightweight and tough. However, in the liquid crystal device of the present invention, not only the reflective display but also the transmissive display are performed, and thus both substrates must be transparent in at least a portion of in the visible light wavelength region.

The liquid crystal layer 106 mainly contains a STN liquid crystal composition twisted 210 to 270°, but a TN liquid crystal composition twisted 90° may be used in the case of a small display capacity. The twist angle is determined by the alignment direction in the upper and lower glass substrates, and the amount of the chiral agent added to the liquid crystal.

As the illumination device, a combination of the light guide 111 and the light source 112 is most general. A diffuser and a condensing prism may be laminated on the light guide. As the light source, a cold cathode tube or a LED (light emitting diode) can be used. EL (electro luminescent) light source serving as a plane light source may be used in place of the illumination device comprising a combination of the light guide and the light source. The first embodiment uses a white cold cathode tube.

As the color filter 121, a color filter having higher transmittance and paler colors than that used for a transmissive color liquid crystal device is used for obtaining bright display in reflection. If required, a black mask may be provided. The color filter can also be provided on the transflector on the second substrate side. Of course, monochromatic display requires no color filter.

The scanning electrodes 122 comprise stripe-formed transparent electrodes made of, for example, ITO.

As the transflector 123, a film comprising a pearl pigment dispersed in a resin is generally used, but this cannot easily be formed in the liquid crystal cell. Therefore, the three methods shown in FIGS. 2(a), (b) and (c) are proposed.

Figure 2A:
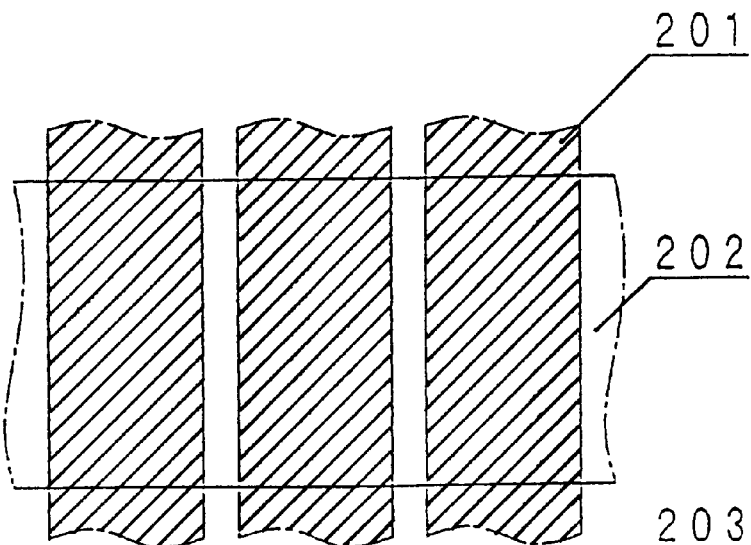
FIG. 2 shows the structure of a transflector used in the liquid crystal device in accordance with the first, third, fourth and sixth embodiments and the comparative examples.

In FIG. 2(a), reference numeral 201 denotes a transflector provided on the second substrate and serving as a signal electrode, and reference numeral 202 denotes a scanning electrode provided on the first substrate and made of ITO, the intersections of both electrodes serving as pixel regions (dots). The hatching region 201 represents an Al sputtered film having a thickness of 200 angstroms, which functions as the transflector for transmitting about 8% of light and reflecting the residual light.

Figure 2B:
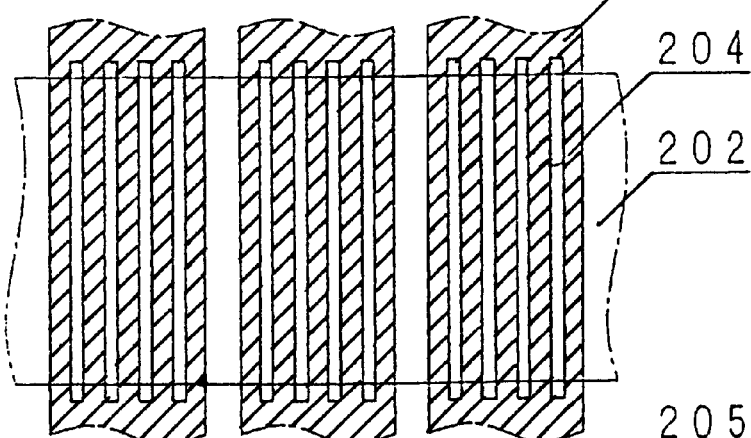

In FIG. 2(b), reference numeral 203 denotes a transflector provided on the second substrate and serving as a signal electrode, and reference numeral 202 denotes a scanning electrode provided on the first substrate and made of ITO. The hatching region 203 represents an Al sputtered film having a thickness of 2000 angstroms, which hardly transmits light, but transmits light incident on a plurality of slit regions 204 provided therein and having a width of 2 $\mu$m. The liquid crystal in the slit regions 204 is operated in substantially the same manner as the region on the Al film due to the oblique electric field produced between the liquid crystal and the scanning electrode opposed thereto, thereby permitting transmissive display. However, since the threshold voltage of the transmissive display varies by about 0.04 V with a change of 1 $\mu$m in the slit width, it is necessary for, particularly, passive matrix driving that the slit width is strictly controlled to have a uniformity of at least ±10% or less.

Figure 2C:
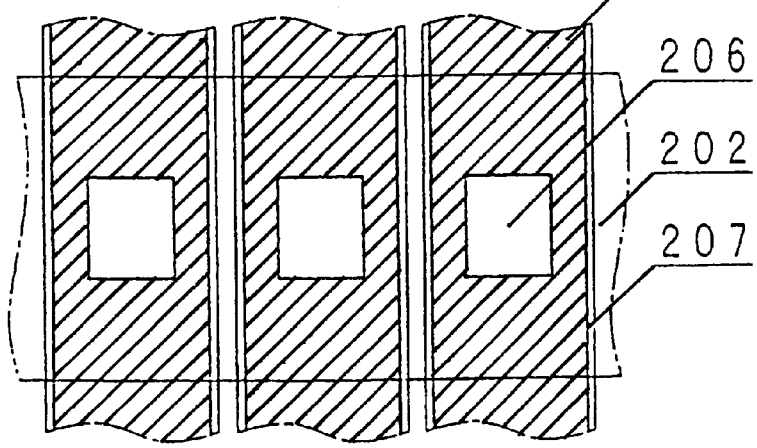

FIG. 2(c) shows an example in which the signal electrode and the transflector are separated. Reference numeral 205 denotes a transflector provided on the second substrate; reference numeral 207, a signal electrode made of ITO and provided over the entire surface of the second substrate 205; and reference numeral 202, a scanning electrode made of ITO and provided on the first substrate. The hatching region 205 of the second substrate represents an Al sputtered film having a thickness of 2000 angstroms, which hardly transmits light, but transmits light incident on the approximately square apertures 206 provided therein. Since the signal electrode 207 made of ITO is coated on the second substrate 205 with an $SiO_2$ insulating film provided therebetween, the liquid crystal at the apertures 206 is normally operated, thereby permitting transmissive display.

Figure 3:
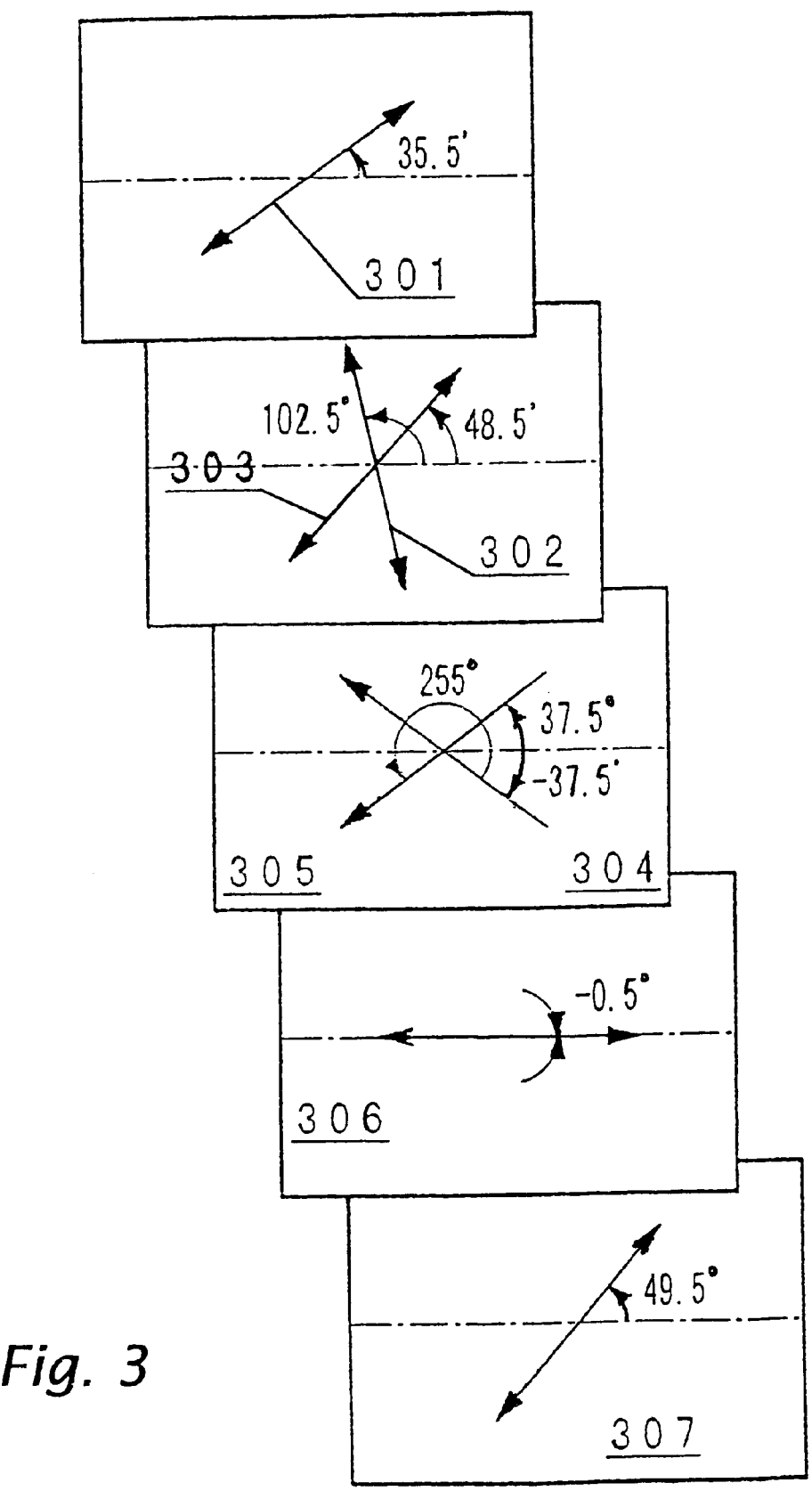
FIG. 3 shows panel conditions of the liquid crystal device in accordance with the first, third, and fourth embodiments.

The panel conditions of the liquid crystal device of this embodiment are described on the basis of FIG. 3. In FIG. 3, five laminated rectangles represent a first polarizer, first and second retardation plates, a liquid crystal cell, a third retardation plate, and a second polarizer, respectively, in turn from the top, and an arrow given in each of the rectangles indicates the axial direction.

The absorption axis direction 301 of the first polarizer is at left 35.5° with respect to the direction of the panel length. The retardation axis 302 of the first retardation plate is at left 102.5° with respect to the direction of the panel length, with a retardation of 455 nm. The retardation axis 303 of the second retardation plate is at left 48.5° with respect to the direction of the panel length, with a retardation of 544 nm. The rubbing direction 304 of the first substrate of the liquid crystal cell is at right 37.5° with respect to the direction of the panel length. The rubbing direction 305 of the second substrate of the liquid crystal cell is at left 37.5° with respect to the direction of the panel length. The liquid crystal is twisted 255° in the counterclockwise direction from the first substrate to the second substrate. The product of the birefringence Δn of the liquid crystal and the cell gap d is 0.90 μm. The retardation axis 306 of the third retardation plate is at right 0.5° with respect to the direction of the panel length, with a retardation of 140 nm. The absorption axis direction 307 of the second polarizer is at left 49.5° with respect to the direction of the panel length.

Under these conditions, for the light emitted from the illumination device, green light at a wavelength 560 nm passes through the transflector in the state of elliptically polarized light with an ellipticity of 0.85. The rotational direction is clockwise, and the polarization state is substantially the same as the light produced when the light incident from the first polarizer side passes through the liquid crystal layer in the dark display state and is reflected by the transflector.

Figure 4:
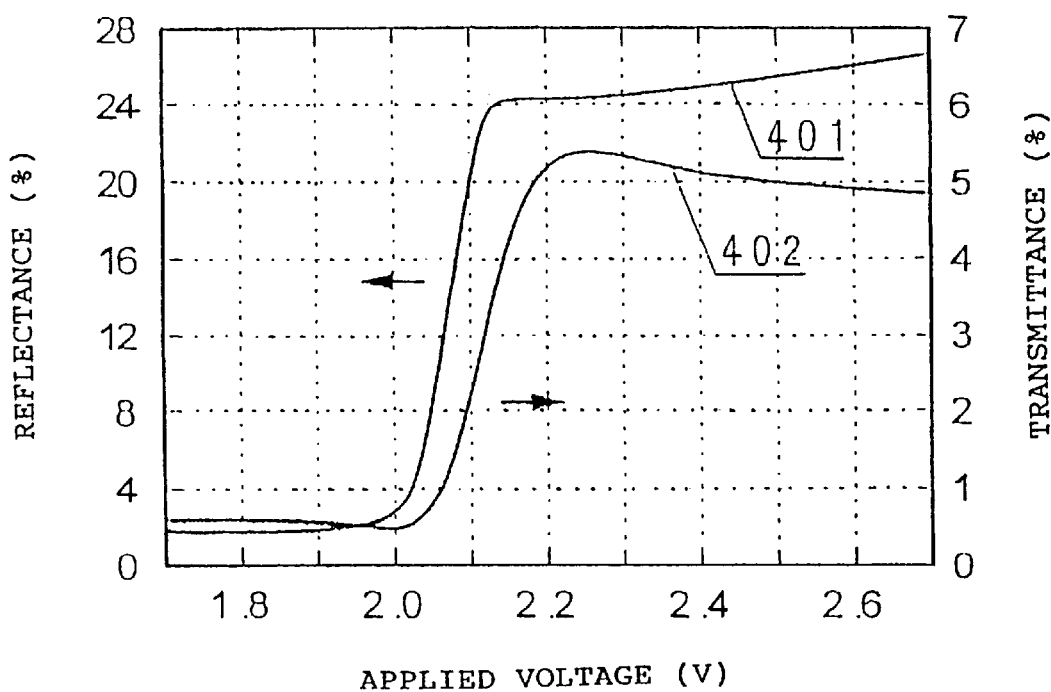
FIG. 4 shows electro-optical characteristics of the liquid crystal device in accordance with the first embodiment.

FIG. 4 shows the electro-optical characteristics of the liquid crystal device of this embodiment. In FIG. 4, the applied voltage is shown on the abscissa, reflectance or transmittance is shown on the ordinate. Reference numeral 401 denotes a voltage-reflectance curve of reflective display, and reference numeral 402 denotes a voltage-transmittance curve of transmissive display. Both the reflective display and transmissive display are normally black display. In multiplex driving with a duty of 1/240, the reflective display showed a contrast of 1:8.0 and brightness of 24%, and the transmissive display showed a contrast of 1:8.1, and brightness of 3.9%.

As a result of measurement of the ellipticity in transmittance of the light emitted from the illumination device through the transflector, and the contrast and brightness of the transmissive display, which is performed with changes in the angle θ of the absorption axis direction 307 of the second polarizer with respect to the direction of the panel length shown in FIG. 3, the results shown in FIG. 14 were obtained.

These results indicate that in order to obtain high contrast in the transmissive display, it is important to bring the ellipticity as close to 1 as possible, i.e., produce circularly polarized light. On the other hand, circularly polarized light is not necessarily optimum from the viewpoint of brightness. Therefore, it is necessary to set the ellipticity in consideration of a balance of contrast and brightness.

In the above-described structure of this embodiment, it is possible to provide a transflective liquid crystal device capable of performing reflective display with high image quality and no parallax, and transmissive display with high contrast.

Comparative Example 1

The following description assumes therefor the light emitted from the illumination device and passing through the transflector is changed to left-handed circularly polarized light, not right-handed circularly polarized light in the first embodiment.

Figure 5:
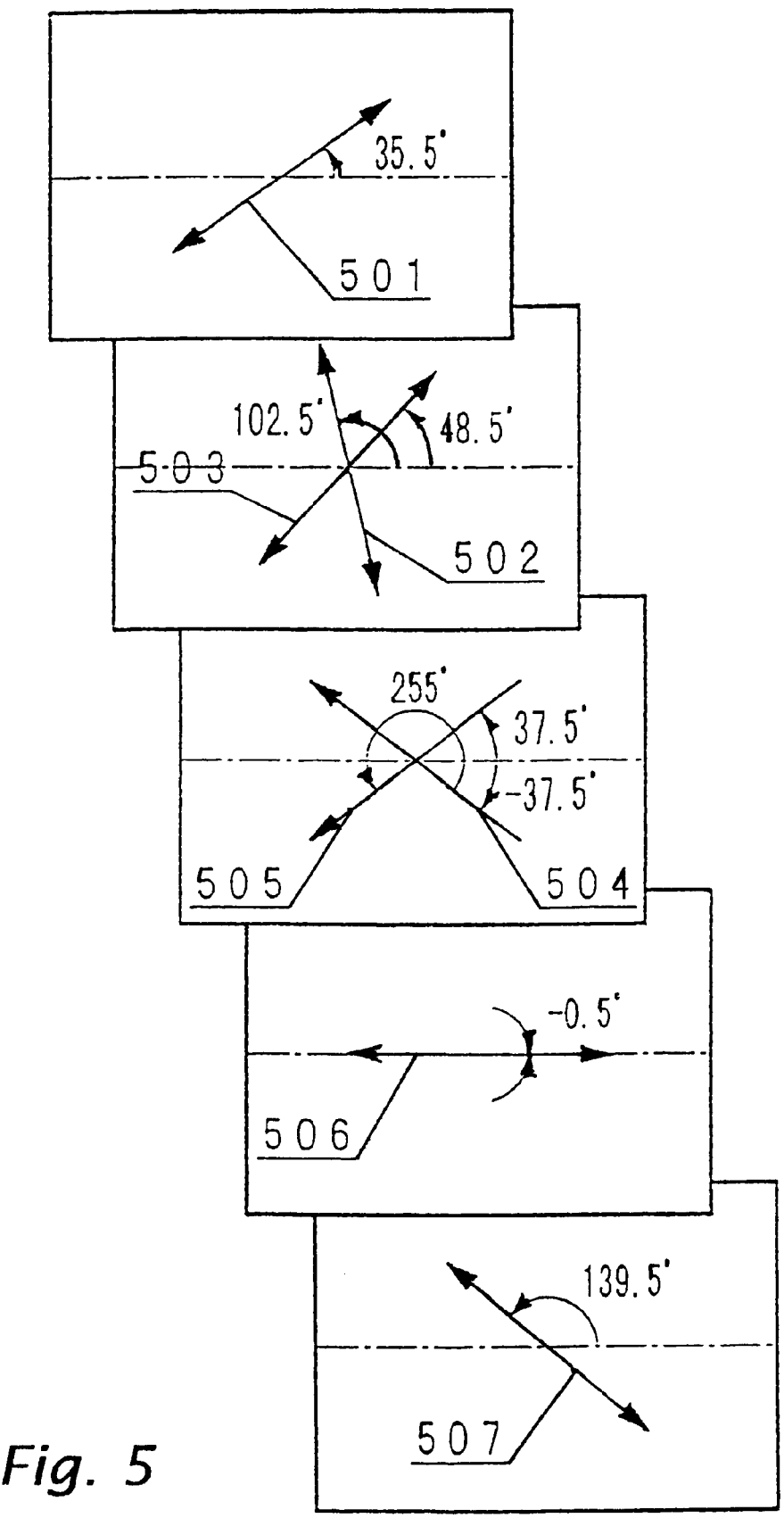
FIG. 5 shows panel conditions of the liquid crystal in accordance with Comparative Example 1.

Only the panel conditions were changed to those shown in FIG. 5 with the structure of the liquid crystal device shown in FIGS. 1 and 2 unchanged. In FIG. 5, five laminated rectangles represent a first polarizer, first and second retardation plates, a liquid crystal cell, a third retardation plate, and a second polarizer, respectively, in turn from the top, and an arrow given in each of the rectangles indicates the axial direction.

The absorption axis direction 501 of the first polarizer is at left 35.5° with respect to the direction of the panel length. The retardation axis direction 502 of the first retardation plate is at left 102.5° with respect to the direction of the panel length, with a retardation of 455 nm. The retardation axis direction 503 of the second retardation plate is at left 48.5° with respect to the direction of the panel length, with a retardation of 544 nm. The rubbing direction 504 of the first substrate of the liquid crystal cell is at right 37.5° with respect to the direction of the panel length. The rubbing direction 505 of the second substrate of the liquid crystal cell is at left 37.5° with respect to the direction of the panel length. The liquid crystal is twisted 255° in the counterclockwise direction from the first substrate to the second substrate. The product of the birefringence Δn of the liquid crystal and the cell gap d is 0.90 μm. The retardation axis 506 of the third retardation plate is at right 0.5° with respect to the direction of the panel length, with a retardation of 140 nm. The absorption axis direction 507 of the second polarizer is at left 139.5° with respect to the direction of the panel length.

Under these conditions, for the light emitted from the illumination device, green light at a wavelength 560 nm passes through the transflector in the state of elliptically polarized light with an ellipticity of 0.85. The rotational direction is counterclockwise, and the polarization state is reversed to that of the elliptically polarized light produced when the light incident from the first polarizer side passes through the liquid crystal layer in the dark display state and then is reflected by the transflector.

Figure 6:
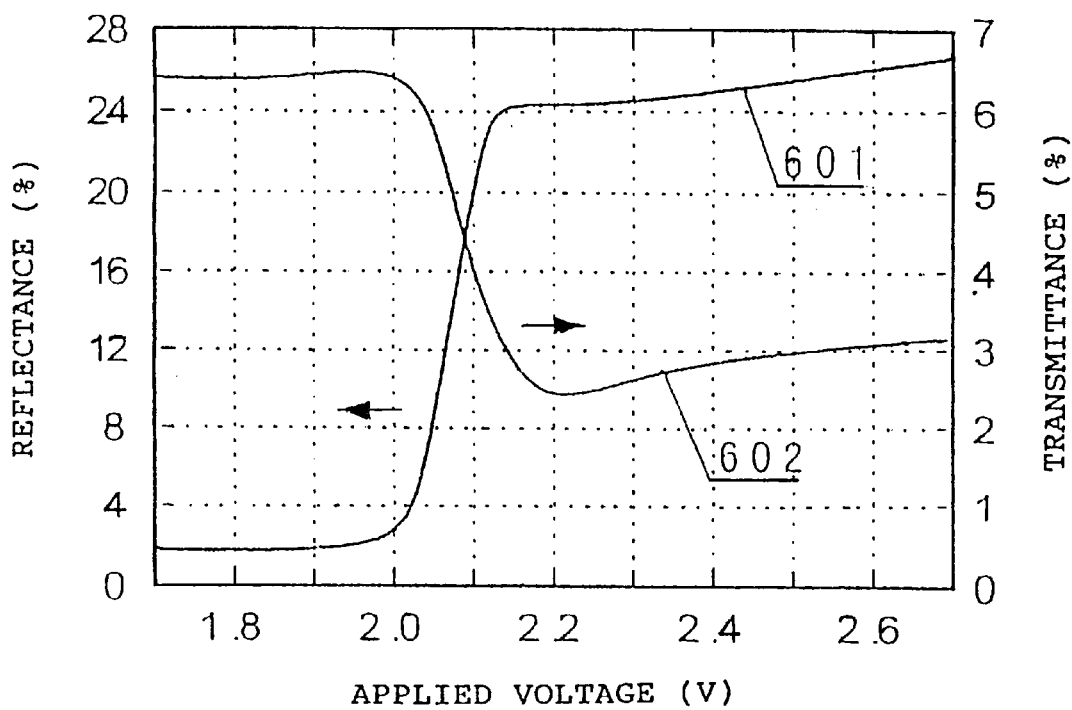
FIG. 6 shows electro-optical characteristics of the liquid crystal device in accordance with Comparative Example 1.

FIG. 6 shows the electro-optical characteristics of the liquid crystal device of this comparative example. In FIG. 6, the applied voltage is shown on the abscissa, reflectance or transmittance is shown on the ordinate. Reference numeral 601 denotes a voltage-reflectance curve of reflective display, and reference numeral 602 denotes a voltage-transmittance curve of transmissive display. The reflective display is normally black display like the liquid crystal device of the first embodiment, while the transmissive display is normally white display.

In this way, when the rotation of the elliptically polarized light, which is close to circularly polarized light and produced when the light emitted from the illumination device passes through the transflector, is reversed to that of the elliptically polarized light, which is also close to circularly polarized light and produced when the light incident from the first polarizer side passes through the liquid crystal layer in the dark display state and then is reflected by the transflector, normal transmissive display is impossible.

Figure 7:
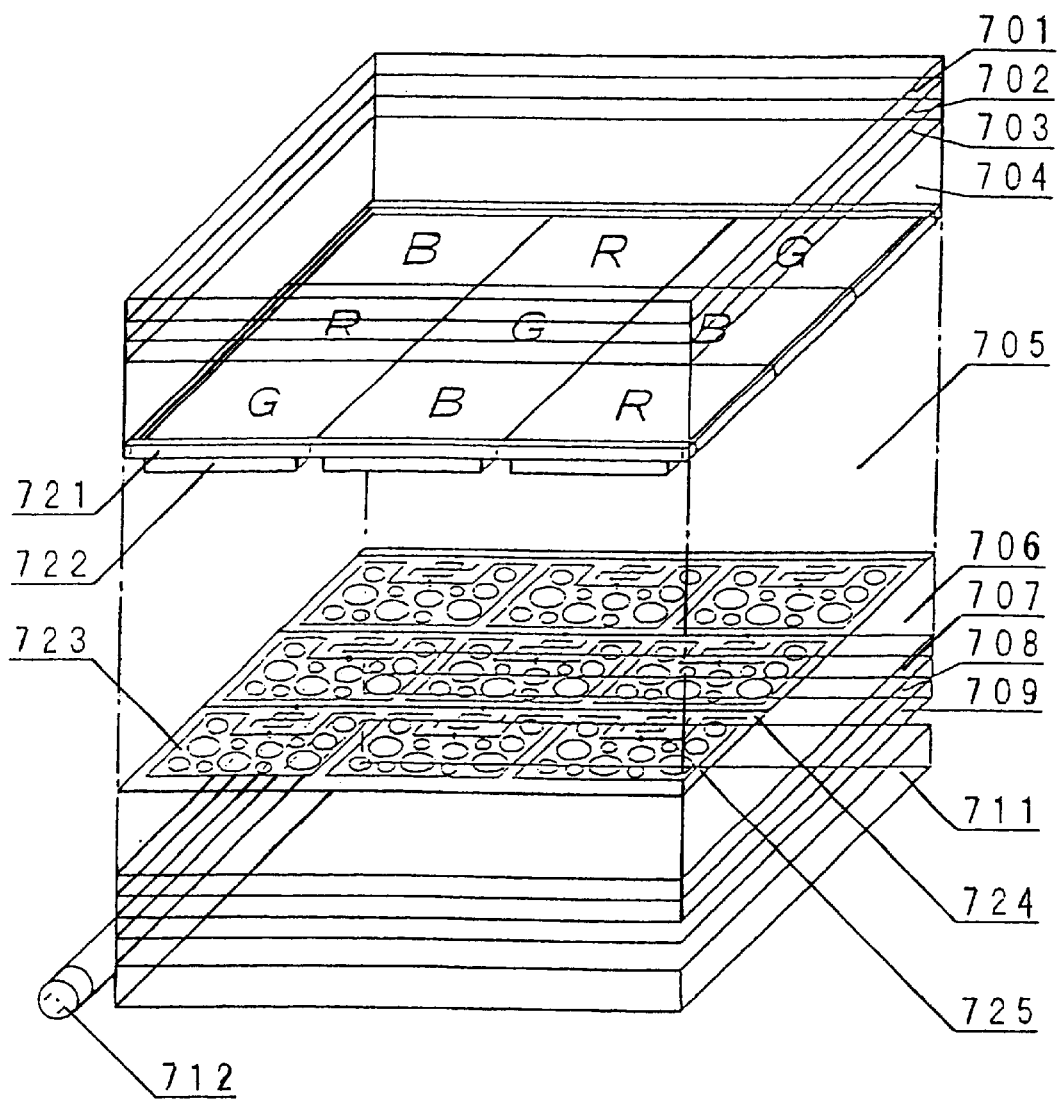
FIG. 7 shows the structure of a liquid crystal device in accordance with a second embodiment.

FIG. 7 is a drawing showing a liquid crystal device in accordance with a second embodiment. The second embodiment basically relates to an active matrix type liquid crystal device, but the same structure can also be applied to a passive matrix type device.

The structure is described on the basis of FIG. 7. Reference numeral 701 denotes a first polarizer; reference numeral 702, a first retardation plate; reference numeral 703, a second retardation plate; reference numeral 704, a first substrate; reference numeral 705, a liquid crystal layer; reference numeral 706, a second substrate; reference numeral 707, a third retardation plate; reference numeral 708, a fourth retardation plate; reference numeral 709, a second polarizer; reference numeral 711, a light guide; and reference numeral 712, a light source. The light guide 711 and the light source 712 constitute an illumination device. Reference numeral 721 denotes a color filer; reference numeral 722, a scanning electrode; reference numeral 723, a transflector also serving as a pixel electrode; reference numeral 724, a signal electrode; and reference numeral 725, a TFD (thin film diode) element. Here the first and second substrates 704 and 706 are widely spaced in order to make clear the drawing, but both substrates are actually opposed to each other with a small gap of several $\mu$m to several tens $\mu$m. Although, as the case may be, elements other than those shown in the drawing, such as a liquid crystal alignment film, upper and lower shortproof films, an over coat film, a spacer ball, a sealing agent, a black mask, an anti-glare film, a liquid crystal driver IC, a driving circuit, etc., are required, these elements are unnecessary for describing the characteristics of the present invention, and are thus omitted here.

Each of the components is described below. The polarizers, the retardation plates, the first substrate, the illumination device, the color filter, the scanning electrode, and the transflector used in this embodiment are the same as the first embodiment. The signal electrode 724 is made of metal Ta. The TFD element 725 has a MIM (metal-insulation film-metal) structure comprising metal Ta and an Al—Nd alloy with the insulation film Ta 205 held therebetween. As the second substrate 706, glass having an irregular surface is used. Therefore, the transflector 723 serves as a diffuse reflector having an irregular structure, and thus the forward scattering plate used in the first embodiment is not required.

Figure 8:
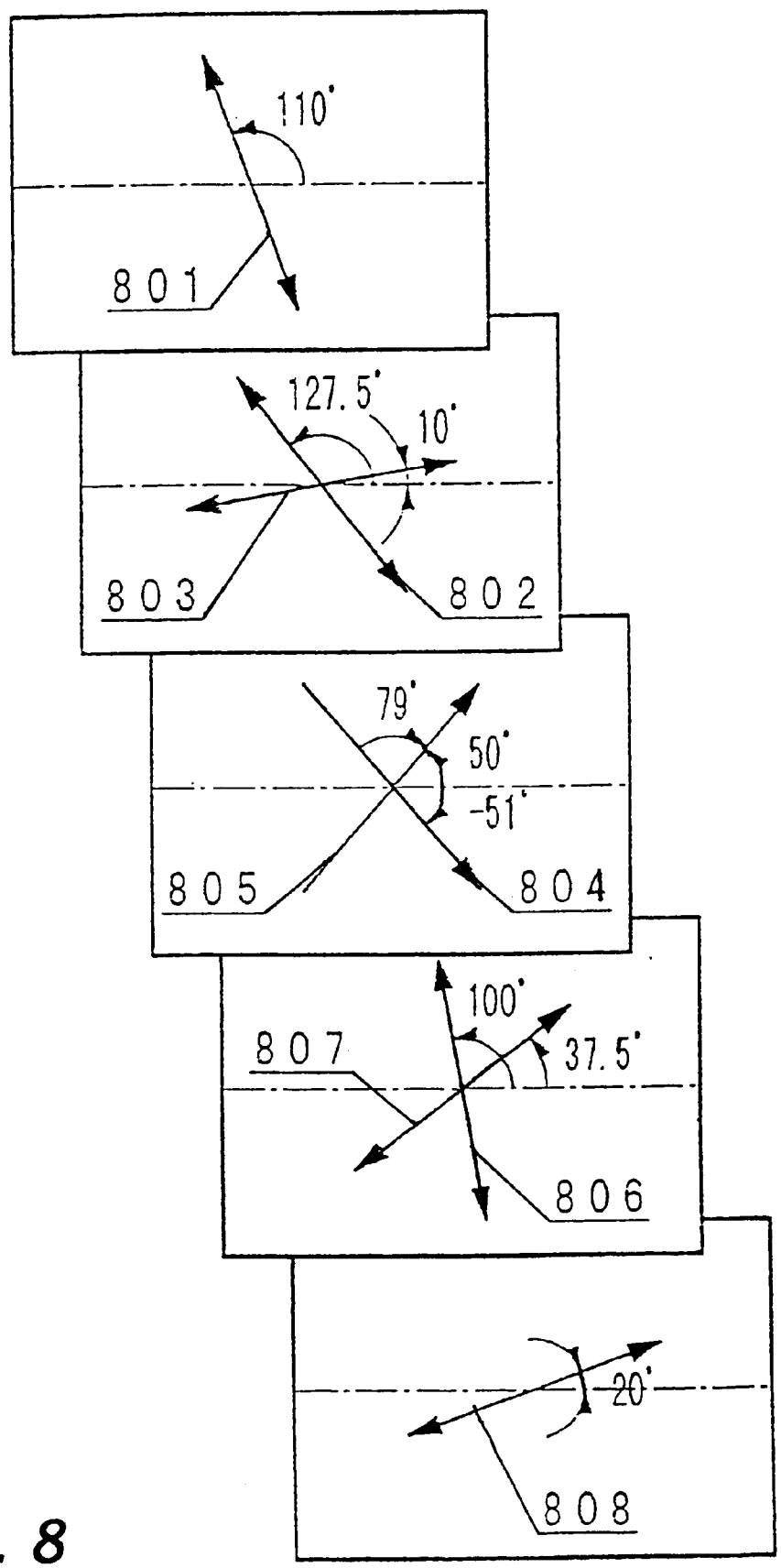
FIG. 8 shows panel conditions of the liquid crystal in accordance with the second embodiment.

The panel conditions of the liquid crystal device of this embodiment are described with reference to FIG. 8. In FIG. 8, five laminated rectangles represent a first polarizer, first and second retardation plates, a liquid crystal cell, third and fourth retardation plates, and a second polarizer, respectively, in turn from the top, and an arrow given in each of the rectangles indicates the axial direction.

The absorption axis direction 801 of the first polarizer is at left 110° with respect to the direction of the panel length. The retardation axis direction 802 of the first retardation plate is at left 127.5° with respect to the direction of the panel length, with a retardation of 270 nm. The retardation axis direction 803 of the second retardation plate is at left 10° with respect to the direction of the panel length, with a retardation of 140 nm. The rubbing direction 804 of the first substrate of the liquid crystal cell is at right 51° with respect to the direction of the panel length. The rubbing direction 805 of the second substrate of the liquid crystal cell is at left 50° with respect to the direction of the panel length. The liquid crystal is twisted 79° in the clockwise direction from the first substrate to the second substrate. The product of the birefringence $\Delta$n of the liquid crystal and the cell gap d is 0.24 $\mu$m. The retardation axis direction 806 of the third retardation plate is at left 100° with respect to the direction of the panel length, with a retardation of 140 nm. The retardation axis direction 807 of the fourth retardation plate is at left 37.5° with respect to the direction of the panel length, with a retardation of 270 nm. The absorption axis direction 808 of the second polarizer is at left 20° with respect to the direction of the panel length.

Under these conditions, the light emitted from the illumination device passes through the transflector in a state that the light is elliptically polarized light with an ellipticity of 0.96 at maximum and close to circularly polarized light, across a relatively wide wavelength range around green light having a wavelength of 560 nm. The rotational direction is counterclockwise, and the polarization state is substantially the same as the light produced when the light incident from the first polarizer side passes through the liquid crystal layer in the dark display state and then is reflected by the transflector.

Figure 9:
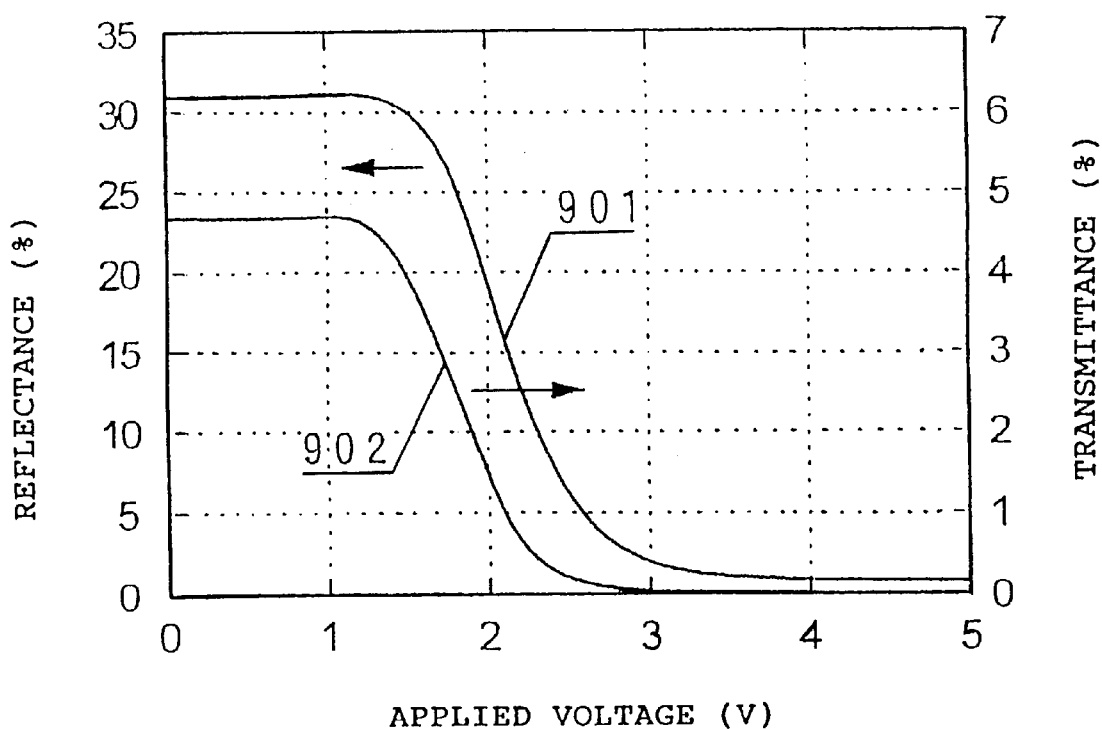
FIG. 9 shows electro-optical characteristics of the liquid crystal device in accordance with the second embodiment.

FIG. 9 shows the electro-optical characteristics of the liquid crystal device of this embodiment. In FIG. 9, the applied voltage is shown on the abscissa, reflectance or transmittance is shown on the ordinate. Reference numeral 901 denotes a voltage-reflectance curve of reflective display, and reference numeral 902 denotes a voltage-transmittance curve of transmissive display. Both the reflective display and transmissive display are normally white display with high contrast.

In the above-described structure of this embodiment, it is possible to provide a transflective liquid crystal device capable of performing reflective display and transmissive display with high contrast and less unnecessary coloring.

The third embodiment concerns an another example of the illumination device which can be applied to the transflective liquid crystal devices of the first and second embodiments. The third embodiment uses a blue EL having a light emission peak at a wavelength of 480 nm in place of the illumination device denoted by 111 and 112 in FIG. 1, or the illumination device denoted by 711 and 712 in FIG. 7. Therefore, a film having a retardation of 120 nm is used as a second retardation plate so that the light emitted from the illumination device is blue light at a wavelength of 480 nm and changed to elliptically polarized light with high ellipticity.

In the above-described structure of this embodiment, it is possible to provide a transflective liquid crystal device capable of performing transmissive display with high contrast even when a color illumination device emitting colored light is used.

The fourth embodiment concerns an example of a reflective polarizer which can be applied to the transflective liquid crystal devices of the first to third embodiments. The fourth embodiment is different from the above embodiments in that a reflective polarizer is used in place of the second polarizer 109 shown in FIG. 1 or the second polarizer 709 shown in FIG. 7.

As the reflective polarizer, a birefringent dielectric multilayered film is used. The birefringent dielectric multilayered film has the function to reflect a predetermined linearly polarized light component and transmit other polarized light components. Details of the birefringent dielectric multilayered film are disclosed in the international application (International Application No.: WO97/1788) and Japanese Unexamined Patent Publication No. 9-506985. Such a reflective polarizer is commercially available as DBEF (trade name) from U.S. 3M Co., Ltd.

The axial direction of the reflective polarizer is arranged so that the reflection axis is parallel to the axis 307, in FIG. 3.

The use of the reflective polarizer as the second polarizer permits the reuse of light because the reflective polarizer reflects the light generally absorbed by the second polarizer, thereby improving the brightness of transmissive display by about 30%.

Figure 10:
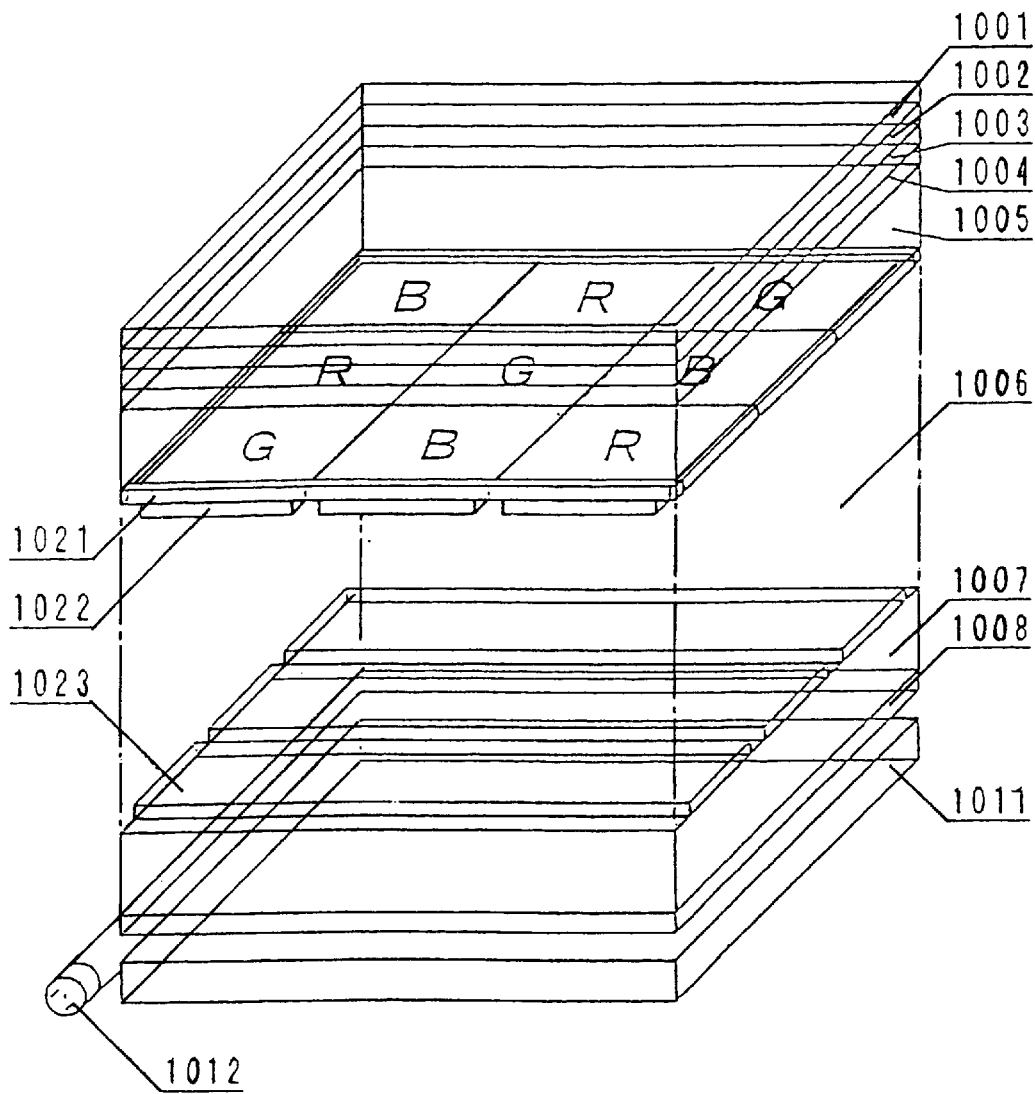
FIG. 10 shows the structure of a liquid crystal device in accordance with a fifth embodiment.

FIG. 10 is a drawing showing the structure of a liquid crystal device in accordance with the fifth embodiment. The construction of the liquid crystal device is described on the basis of FIG. 10. Reference numeral 1001 denotes a first polarizer; reference numeral 1002, a first retardation plate; reference numeral 1003, a second retardation plate; reference numeral 1004, a forward scattering plate; reference numeral 1005, a first substrate; reference numeral 1006, a liquid crystal layer; reference numeral 1007, a second substrate; reference numeral 1008, a circularly polarized light reflector; reference numeral 1011, a light guide; and reference numeral 1012, a light source. The light guide 1011 and the light source 1012 constitute an illumination device. Reference numeral 1021 denotes a color filer; reference numeral 1022, a scanning electrode; and reference numeral 1023, a transflector also serving as a signal electrode. Here the first and second substrates 1005 and 1007 are widely spaced in order to make clear the drawing, but both substrates are actually opposed to each other with a small gap of several μm to several tens μm. Although, as the case may be, elements other than those shown in the drawing, such as a liquid crystal alignment film, upper and lower short circuit preventing films, an over coat film, a spacer ball, a sealing agent, a black mask, an anti-glare film, a liquid crystal driver IC, a driving circuit, etc., are required, these elements are unnecessary for describing the characteristics of the present invention, and are thus omitted here.

Each of the components is described below. The polarizers, the retardation plates, the forward scattering plate, the substrates, the illumination device, the color filter, the scanning electrode, and the transflector used in this embodiment are the same as the first embodiment.

The panel conditions including axial directions and retardation of the liquid crystal device of this embodiment are also same as the first embodiment shown in FIG. 3 with respect to the first polarizer, the first retardation plate, the second retardation plate, and the liquid crystal cell. This embodiment is characterized by using, as a selective reflecting layer, the circularly polarized light reflector, which transmits right-handed circularly polarized light, in place of the third retardation plate and the second polarizer.

As the circularly polarized light reflector, a liquid crystal polymer exhibiting a cholesteric phase can be used. This polymer has the function to reflect a predetermined circularly polarized light component and to transmit other polarized light components. Details of such a polarized light separation means are disclosed in Japanese Unexamined Patent Publication No. 8-271892.

In this embodiment, the light emitted from the illumination device passes through the transflector in the state of elliptically polarized light with ellipticity of 1.00, i.e., circularly polarized light, across a relatively wide wavelength range around the wavelength of 560 nm. The rotational direction is clockwise, and the polarization state is substantially the same as the light produced when the light incident from the first polarizer side passes through the liquid crystal layer in the dark display state and then is reflected by the transflector.

By using the reflective polarizer in place of the third retardation plate and the second polarizer, a transflective display which is inexpensive and has thin structure can be realized. Since completely circularly polarized light is obtained, there is the effect of obtaining high contrast in transmissive display. Also, light which should be absorbed by the second polarizer can be reused, thereby exhibiting the effect of improving brightness of transmissive display by about 30%.

The sixth embodiment relates to a TFD active matrix liquid crystal element which can be applied to the transflective liquid crystal devices of the first, second and fifth embodiments.

Figure 15A:
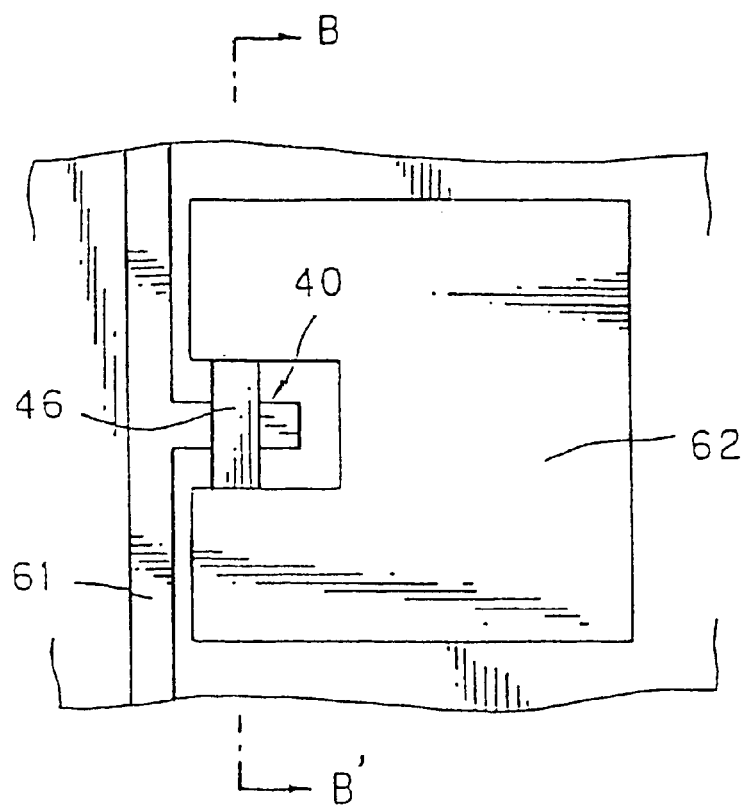
FIG. 15a is a plan view schematically showing a TFD driving element together with a pixel electrode in accordance with the sixth embodiment of the present invention.
Figure 15B:
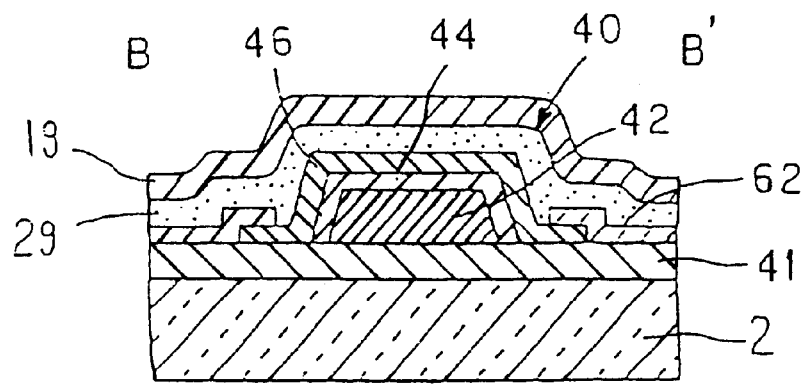

First, the construction of the vicinity of a TFD driving element as an example of a two-terminal non-linear element used in this embodiment is described with reference to FIGS. 15a and 15b. FIG. 15a is a plan view schematically showing the TFD driving element together with a pixel electrode, and the like, and FIG. 15b is a sectional view taken along line B–B' in FIG. 15a. In FIG. 15b, respective layers and members are shown on different contraction scales, so that each of the layers and members has a size which can be recognized in the drawing.

In FIGS. 15a and 15b, a TFD driving element 40 is formed on an insulation film 41 served as an under layer film formed on a transparent substrate 2, and has a TFD structure (Thin Film Diode) or MIM structure (Metal Insulator Metal structure) comprising a first metal film 42, an insulation layer 44 and a second metal film 46, which are formed in this order from the insulation film 41 side. The first metal film 42 of the TFD driving element 40 is connected to a scanning line 61 formed on the transparent substrate 2, and the second metal film 46 is connected to a pixel electrode 62 made of a conductive reflection film, which is an another example of reflection electrodes. Of course, a data line (described below) may be formed on the transparent substrate 2 in place of the scanning line 61 and connected to the pixel electrode 62, and the scanning line 61 may be provided on the counter substrate side.

The transparent substrate 2 comprises a substrate of, for example, glass, plastic, or the like, which has insulation and transparency. The insulation film 41 serving as the under layer film is made of, for example, tantalum oxide. However, the insulation film 41 is formed for, mainly preventing separation of the first metal film 42 from the under layer film due to the heat treatment performed after deposition of the second metal film 46, and preventing impurity diffusion from the under layer film into the first metal film 42.

Therefore, when the transparent substrate 2 comprises a substrate having excellent heat resistance and purity, for example, such as a quartz substrate or the like, without causing the problems of separation and impurity diffusion, the insulation film 41 can be omitted. The first metal film 42 comprises a conductive metal thin film made of, for example, a tantalum single metal or tantalum alloy. The insulation film 44 comprises an oxide film formed on the surface of the first metal film 42 by anodic oxidation in, for example, a formation solution. The second metal film 46 comprises a conductive metal film made of, for example, a chromium single metal or chromium alloy.

In this embodiment, particularly, the pixel electrode 62 is formed to have a transmission region such as a rectangular or square slit, a fine aperture, or the like formed therein, as in the above-described embodiments, or formed in a size smaller than the transparent electrode formed on the counter substrate for each of the pixels so that light can be transmitted through the spaces between the electrodes.

Furthermore, a transparent insulation film 29 is provided on the pixel electrode 62, the TFD driving element 40, and the scanning line 61 on the side (the upper side of the drawing) which faces the liquid crystal, and an alignment film 19 comprising an organic thin film, for example, such as a polyimide thin film or the like, and subjected to predetermined alignment treatment such as rubbing or the like is provided on the transparent insulation film 29.

Although examples of the TFD driving element as a two-terminal non-linear element have been described above, a two-terminal non-linear element having bidirectional diode characteristics, such as a ZnO (zinc oxide) varistor, a MSI (Metal Semi-Insulator) driving element, RD (Ring diode), or the like, can also be applied to the reflective liquid crystal device of this embodiment.

Figure 16:
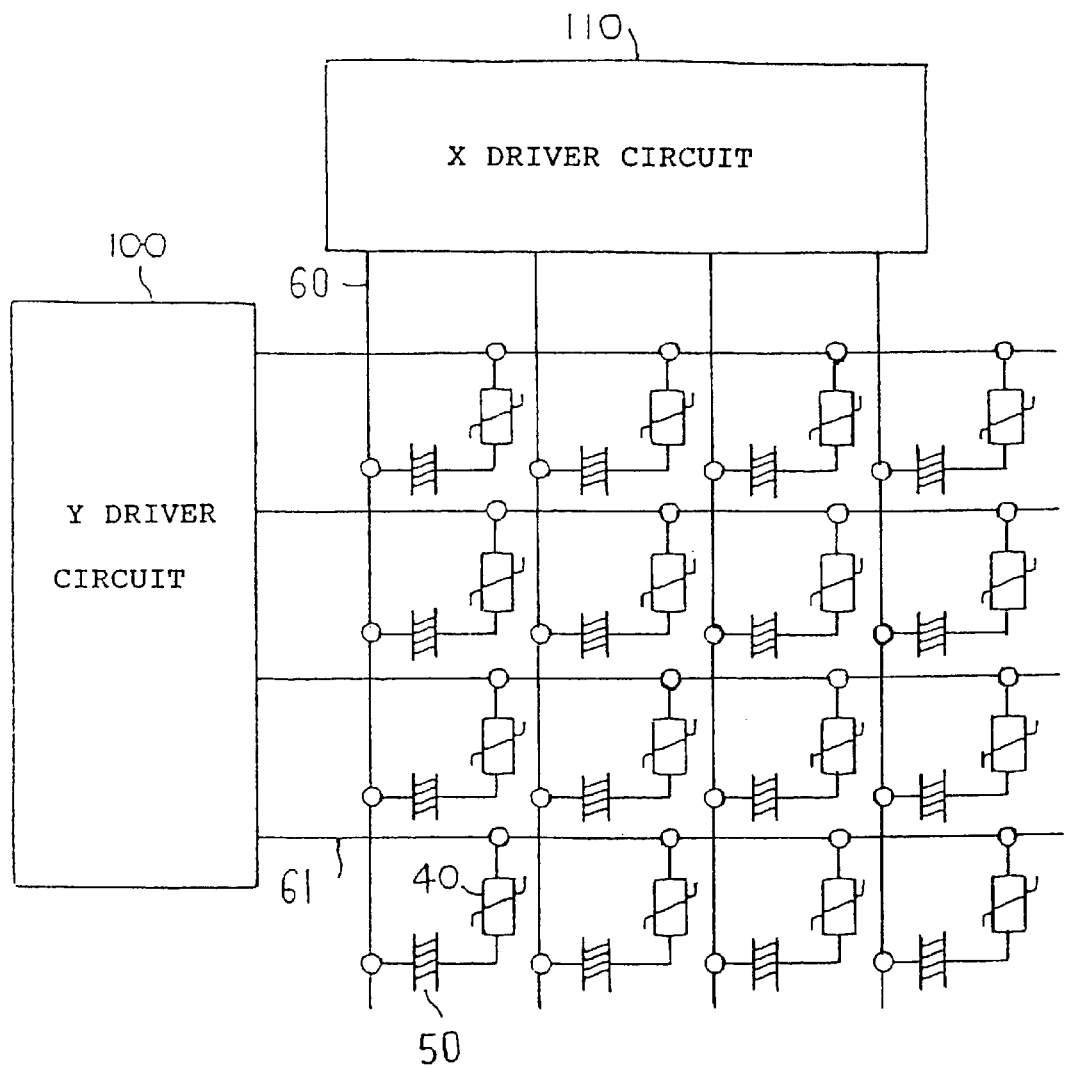
FIG. 16 is a equivalent circuit diagram showing liquid crystal elements in accordance with the sixth embodiment together with driver circuits.

The construction and operation of the TFD active matrix driving system transflective liquid crystal device of the sixth embodiment comprising the TFD driving element constructed as described above will be described with reference to FIGS. 16 and 17. FIG. 16 is a drawing showing equivalent circuits of a liquid crystal element together with driver circuits, and FIG. 17 is a partially cutaway perspective view schematically showing the liquid crystal element.

In FIG. 16, in the TFD active matrix driving system transflective liquid crystal device, a plurality of scanning lines 61 arranged on the transparent substrate 2 are connected to a Y driver circuit 100 which constitutes an example of scanning line driver circuits, and a plurality of data lines 60 arranged on the counter substrate are connected to a X driver circuit 110 which constitutes an example of data line driver circuits. The Y driver circuit 100 and the X driver circuit 110 may be formed on the transparent substrate 2 or the counter substrate. In this case, the transflective liquid crystal device is a built-in driver circuit type. Alternatively, the Y driver circuit 100 and the X driver circuit 110 may comprise external IC independent of the transflective liquid crystal device and be connected to the scanning lines 61 and the data lines 60 through predetermined wiring. In this case, the transflective liquid crystal device contains no driver circuit.

In each of the pixel regions formed in a matrix, the scanning line 61 is connected to one of the terminals of the TFD driving element 40 (refer to FIGS. 15a and 15b), and the data line 60 is connected to the other terminal of the TFD driving element 40 through the liquid crystal layer 3 and the pixel electrode 62. Therefore, when a scanning signal is supplied to the scanning line 61 corresponding to each of the pixel regions, and a data signal is supplied to the data line 60, then, the TFD driving element 40 in each of the pixel regions is turned on to apply a driving voltage to the liquid crystal layer 3 between the pixel electrode 62 and the data line 60, through the TFD driving element 40. As a result, external light is reflected by the pixel electrode 62 to perform reflective display in the light, and source light from the back light is transmitted through the slits or the like in the pixel electrode 62 to perform transmissive display in the dark.

Figure 17:
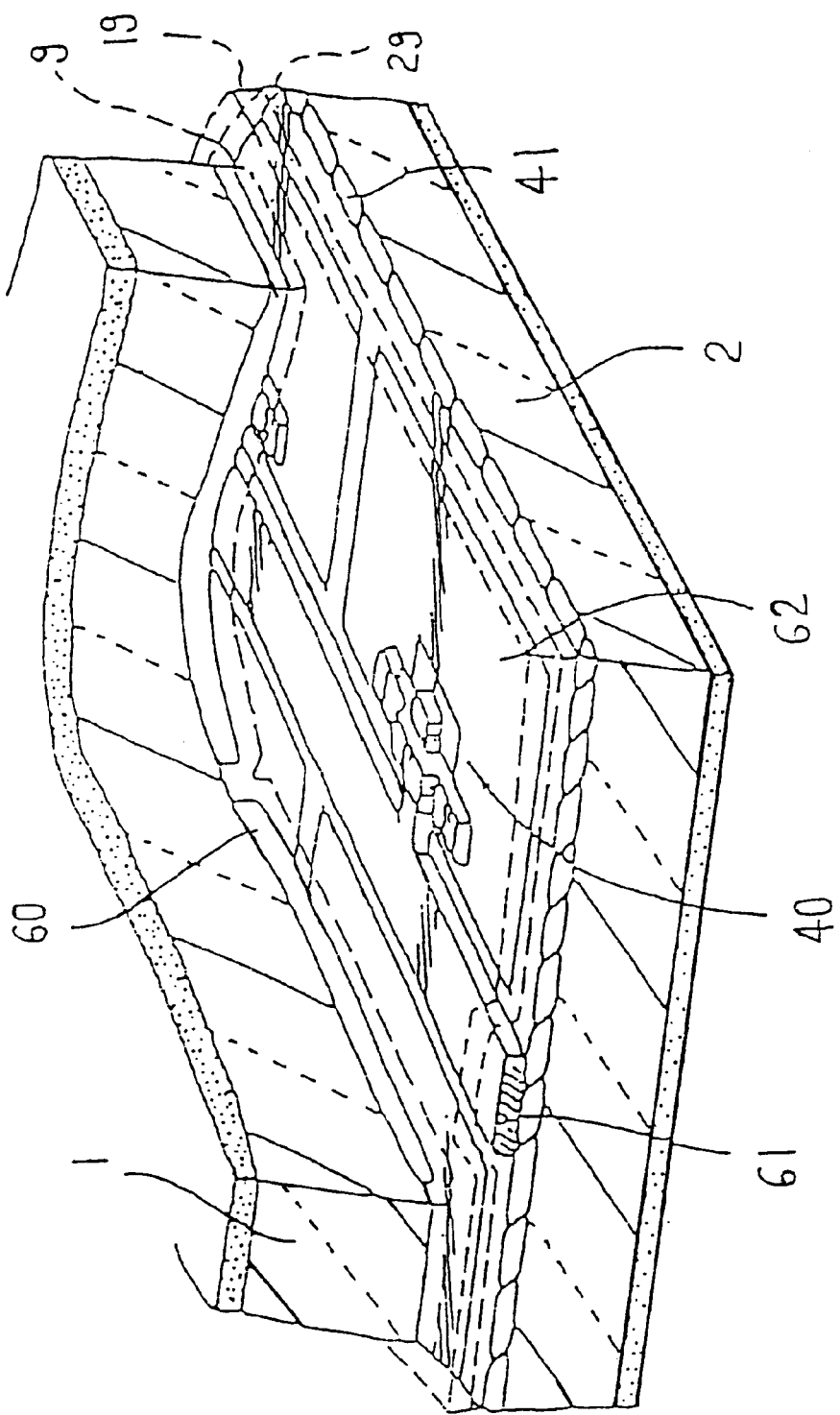
FIG. 17 is a partially cutaway perspective view schematically showing the liquid crystal element in accordance with the sixth embodiment.

In FIG. 17, the transflective liquid crystal device comprises the transparent substrate 2 and the transparent substrate (counter substrate) 1 arranged opposite thereto. The transparent substrate 1 comprises, for example, a glass substrate. The matrix-formed pixel electrodes 62 are provided on the transparent substrate 2 so that each of the pixel electrodes 62 is connected to the scanning line 61. A plurality of data lines 60 as transparent electrodes are provided on the transparent substrate 1 to be arranged in strips extending in the direction crossing the scanning lines 61, and each of the data lines 60 comprises a transparent conductive thin film, for example, such as a ITO (Indium Tin Oxide) film or the like. An alignment film 9 comprising an organic thin film, for example, such as a polyimide thin film, or the like, and subjected to predetermined alignment treatment such as rubbing is provided under the data lines 60. Further, a color filter comprising colorant films arranged in the form of stripes, mosaic, triangles, or the like is provided on the transparent substrate 1 according to purpose.

Furthermore, a transparent insulation film 29 is provided on the pixel electrode 62, the TFD driving element 40, and the scanning line 61 on the side (the upper side of the drawing) which faces the liquid crystal, and an alignment film 19 comprising an organic thin film, for example such as polyimide thin film or the like, and subjected to predetermined alignment treatment such as rubbing or the like is provided on the transparent insulation film 29.

As described above, the TFD active matrix driving system transflective liquid crystal device of the sixth embodiment permits realization of a color liquid crystal device capable of switching reflective display and transmissive display without a double image and bleeding in display. Particularly, the transflective liquid crystal device can be driven in a normally black mode by controlling the voltage in the X and Y driver circuits 110 and 100 each of which constitutes an example of driving means.

The seventh embodiment relates to a TFT active matrix type liquid crystal element which can be applied to the transflective liquid crystal devices of the first, second and fifth embodiments.

Figure 18:
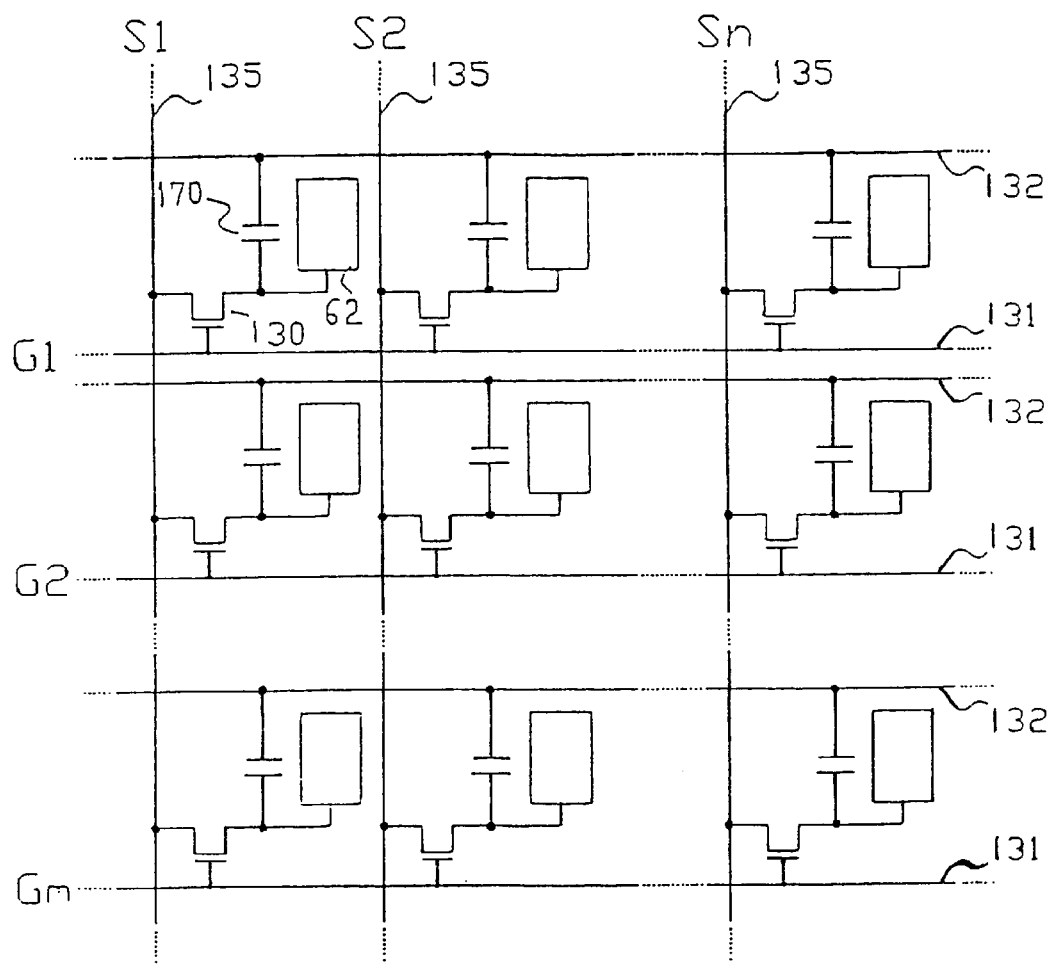
FIG. 18 shows equivalent circuits comprising various elements, wiring, etc. in a plurality of pixels formed in a matrix to constitute an image display region of a liquid crystal device in accordance with a seventh embodiment of the present invention.
Figure 19:
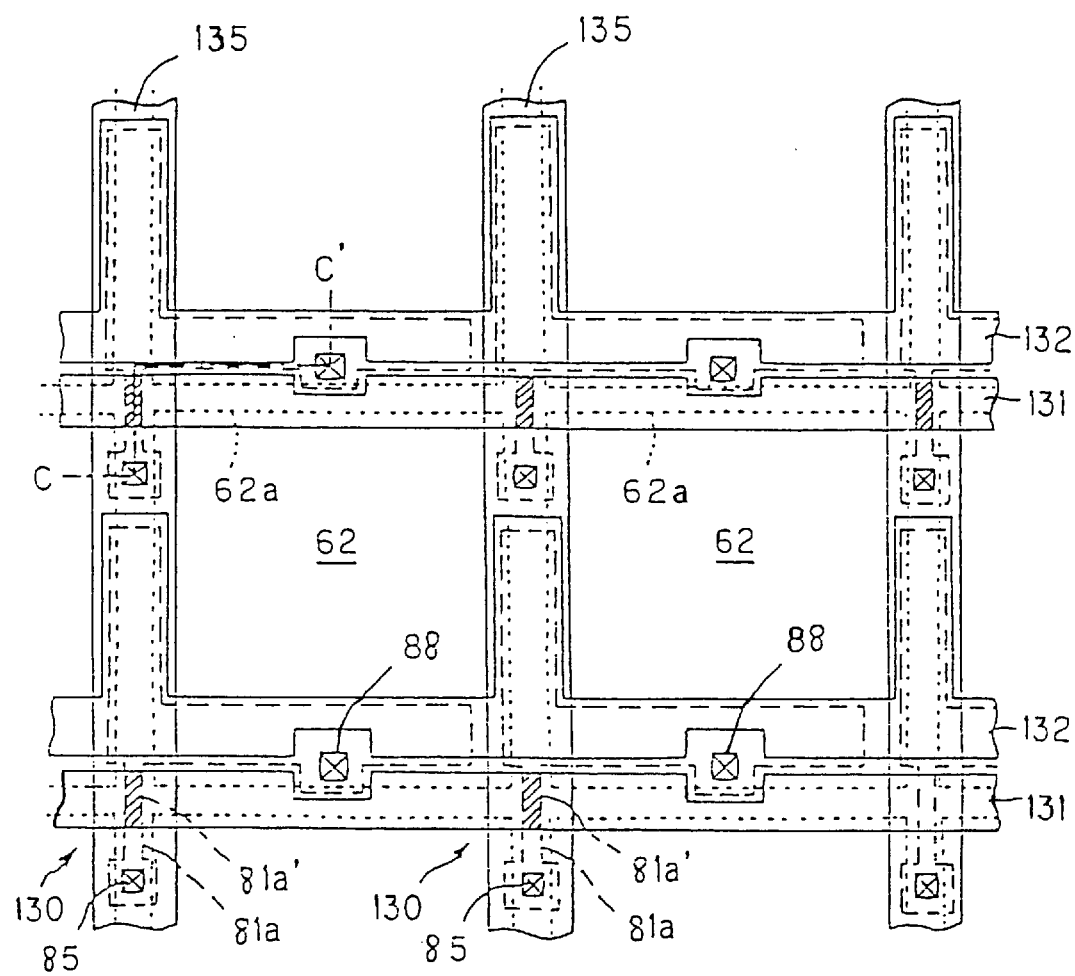
FIG. 19 is a plan view showing a plurality of adjacent pixel groups on a transparent substrate on which data lines, scanning lines, pixel elements, etc. are formed in accordance with the seventh embodiment.
Figure 20:
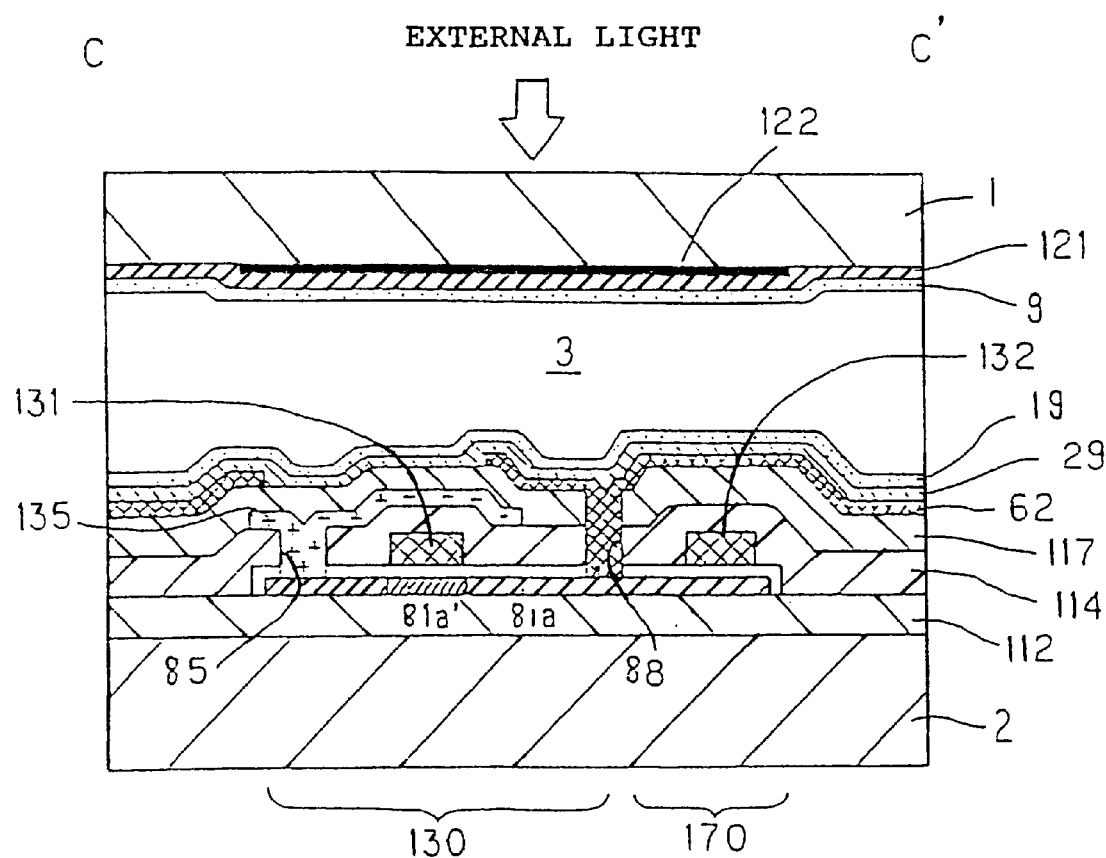
FIG. 20 is a sectional view taken along line C–C' in FIG. 19.

FIG. 18 shows equivalent circuits of various elements and wiring in a plurality of pixels which are formed in a matrix to form the image display region of the liquid crystal device. FIG. 19 is a plan view of a plurality of adjacent pixel groups on the transparent substrate on which data lines, scanning lines, and pixel electrodes are formed. FIG. 20 is a sectional view taken along line C–C' in FIG. 19. In FIG. 20, respective layers and members are shown on different contraction scales, so that each of the layers and members has a size which can be recognized in the drawing.

In FIG. 18, in the TFT active matrix system transflective liquid crystal device of the eleventh embodiment, a plurality of TFT 130 are formed in a matrix in order to control the pixel electrodes 62 as another example of reflecting electrodes arranged in a matrix, and data lines 135 to be supplied with image signals are electrically connected to the sources of the TFT 130. Image signals S1, S2, . . . , Sn written on the data lines 135 may be supplied in this order in a manner of line at a time, or supplied for each group of the plurality of data lines 135 adjacent each other. In addition, scanning lines 131 are electrically connected to the gates of the TFT 130 so that scanning signals G1, G2, . . . , Gm are applied like pulses to the scanning lines 131 in this order with predetermined timing. The pixel electrodes 62 are electrically connected to the drains of the TFT 130 so that the image signals S1, S2, . . . , Sn supplied from the data lines 135 are written with predetermined timing by closing the switches of the TFT 130 serving as switching elements for a predetermined time. The predetermined level image signals S1, S2, . . . , Sn written in the liquid crystal through the pixel electrodes 62 are held for a predetermined time between the pixel electrodes and the counter electrode (described below) formed on the counter substrate (described below). In order to prevent leakage of the held image signals, a storage capacitor 170 is added in parallel with the liquid crystal capacity formed between the pixel electrodes 62 and the outer electrode.

In FIG. 19, the pixel electrode 62 (the outlines are shown by dotted lines 62a in the drawing) comprising reflecting films are provided in a matrix on the transparent substrate 2 as a TFT array substrate, and the data lines 135, the scanning lines 131 and capacity lines 132 are provided along the longitudinal and transverse boundaries of the pixel electrodes 62. The data lines 135 are electrically connected to the source regions of semiconductor layers 81a comprising a polysilicon film or the like, through contact holes 85. The pixel electrodes 62 are electrically connected to the drain regions of the semiconductor layers 81a through contact holes 88. The capacity lines 132 are arranged opposite to first storage capacity electrodes extended from the drain regions of the semiconductor layers 1a through an insulating film to form the storage capacity 170. The scanning lines 131 are arranged opposite to channel regions 81a' shown by shadowed portion with the lines drawn diagonally to the right of the drawing out of the regions of the semiconductor layer 81a, and the scanning lines 131 function as gate electrodes. In this way, the TFT 130 is provided at each of the intersections of the scanning lines 131 and the data lines 135 in which the scanning lines 131 are arranged as the gate electrodes opposite to the channel regions 81a'.

As shown in FIG. 20, the liquid crystal device comprises the transparent substrate 2 and the transparent substrate (counter substrate) 1 opposed thereto. Each of the substrates 1 and 2 comprises a substrate having insulation and transparency, for example, such as quartz, glass, plastic, or the like.

In this embodiment, particularly, each of the pixel electrodes 62 is formed to have a transmission region such as a rectangular or square slit, a fine aperture, or the like formed therein, as in the above-described embodiments, or formed in a size smaller than the transparent electrode formed on the counter substrate for each of the pixels so that light can be transmitted through the spaces between the pixel electrodes.

Furthermore, a transparent insulation film 29 is provided on the pixel electrodes 62, TFT 130, etc. on the side (the upper side of the drawing) which faces the liquid crystal, and an alignment film 19 comprising an organic thin film, for example, such as a polyimide thin film or the like, and subjected to predetermined alignment treatment such as rubbing or the like is provided on the transparent insulation film 29.

On the other hand, a counter electrode 121 as another example of transparent electrodes is formed over the substantially entire surface of the transparent substrate 1, and a second shielding film 122 referred to as a "black mask" or "black matrix" is provided in the non-aperture region of each of the pixels. An alignment film 9 comprising an organic thin film, for example, such as a polyimide thin film, or the like, and subjected to predetermined alignment treatment such as rubbing is provided under the counter electrode 121. Further, a color filter, not shown is the drawing, comprising colorant films arranged in the form of stripes, mosaic, triangles, or the like is provided on the transparent substrate 1 according to purpose. In order to prevent leakage of the held image signals, a storage capacitor 170 is added in parallel with the liquid crystal capacity formed between the pixel electrodes and the counter electrode.

A pixel switching TFT 130 for controlling switching of each of the pixel electrodes 62 is provided at the position adjacent to each of the pixel electrodes 62 on the transparent substrate 2.

As in the first embodiment, a liquid crystal is sealed in the space surrounded by a sealing agent between a pair of the transparent substrates 1 and 2, which are constructed as described above and arranged so that the pixel electrodes 62 are opposite to the counter electrode 121, to form a liquid crystal layer 3.

Further, a first interlayer insulation film 112 is provided below the plurality of pixel switching TFT 130. The first interlayer insulation film 112 is formed over the entire surface of the transparent substrate 2 to function as a base film for the pixel switching TFT 130. The first interlayer insulation film 112 comprises, for example, highly insulating glass such as NSG (non-doped silicate glass), PSG (phosphorus silicate glass), BSG (boron silicate glass), BPSG (boron phosphorus silicate glass), or the like; a silicon oxide film; a silicon nitride film, or the like.

In FIG. 20, each of the pixel switching TFT 130 comprises the source region connected to the data line 135 through the contact hole 85, the channel region 81a' arranged opposite to the scanning line 131 through the gate insulation film, and the drain region connected to the pixel electrode 62 through the contact hole 88. The data lines 131 comprise a light-shielding and conductive thin film such as a low-resistance metal film of Al or the like, and an alloy film of metal silicide or the like. A second interlayer insulation film 114 having the contact holes 85 and 88 formed therein is formed on the data lines 131, and a third interlayer insulation film 117 having the contact holes 88 formed therein is formed on the second insulation film 114. Like the first interlayer insulation film 112, each of the second and third interlayer insulation films 114 and 117 comprises high-insulation glass such as NSG, PSG, BSG, BPSG, or the like; a silicon oxide film; a silicon nitride film; or the like.

The pixel switching TFT 130 may be TFT having any one of a LDD structure, an offset structure, a self alignment structure, and the like. In addition, the TFT 130 may have a single gate structure, a dual gate structure, or at least a triple gate structure.

Three examples of electronic apparatus of the present invention are described below. The liquid crystal device of the present invention is suitable for portable apparatus, which is used in various environments and requires low power consumption.

Figure 11A:
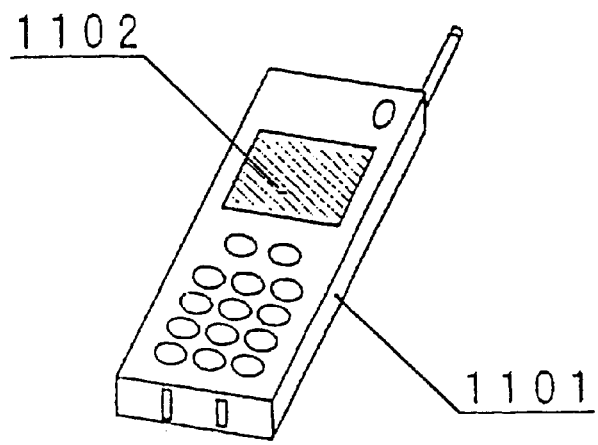
FIG. 11 shows electronic apparatuses in accordance with an eight embodiment, in which FIGS. 11(a), (b) and (c) show a portable telephone, a watch, and a portable information device, respectively.

FIG. 11(a) shows a portable telephone comprising a display unit 1102 provided in the upper portion of the front side of a body 1101. A portable telephone is used in any indoor and outdoor environments. Particularly, a portable telephone is frequency used in an automobile in which the inside is very dark at night. Therefore, as a display device used in a portable telephone, a transflective liquid crystal device is preferred, which is capable of mainly performing reflective display with low power consumption, and performing transmissive display by using auxiliary light according to demand. The liquid crystal device of the present invention exhibits high contrast both in reflective display and transmissive display, as compared with a conventional liquid crystal device.

Figure 11B:
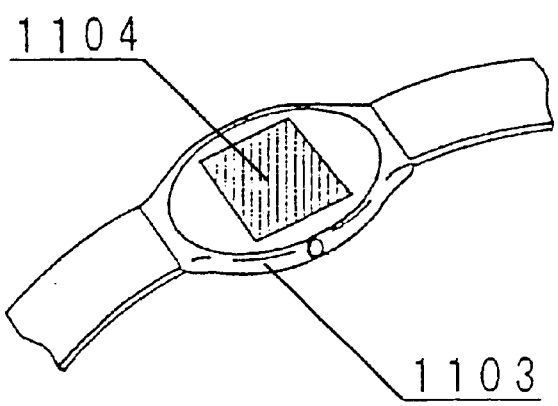

FIG. 11(b) shows a watch comprising a display unit 1104 provided at the center of a body 1103. An important viewpoint of application to watches is a feeling of high quality. The liquid crystal device of the present invention exhibits not only high contrast but also no double image due to parallax, thereby obtaining a display having a feeling of high quality as compared with a conventional liquid crystal device. The display can also be recognized in the dark.

Figure 11C:
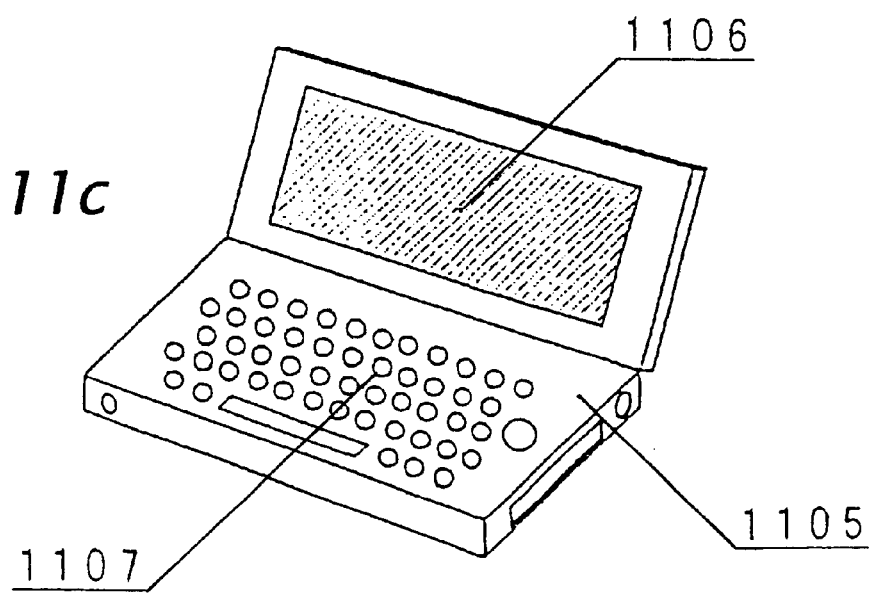
Figure 12A:
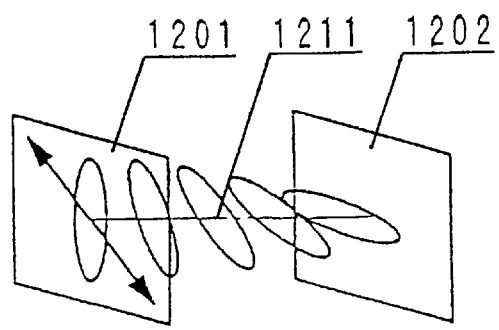
FIG. 12 is a drawing illustrating the display operation of the liquid crystal device in accordance with the first to sixth embodiments.
Figure 12B:
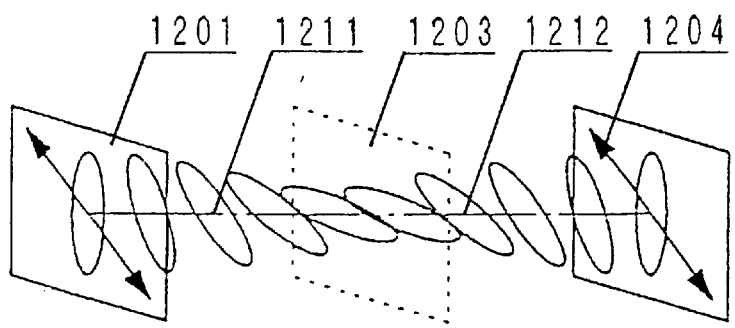
Figure 12C:
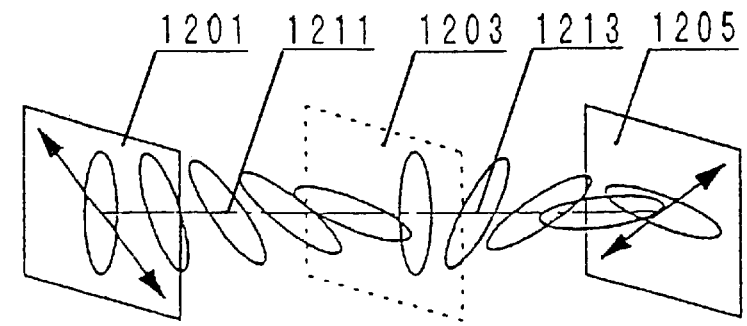
Figure 13:
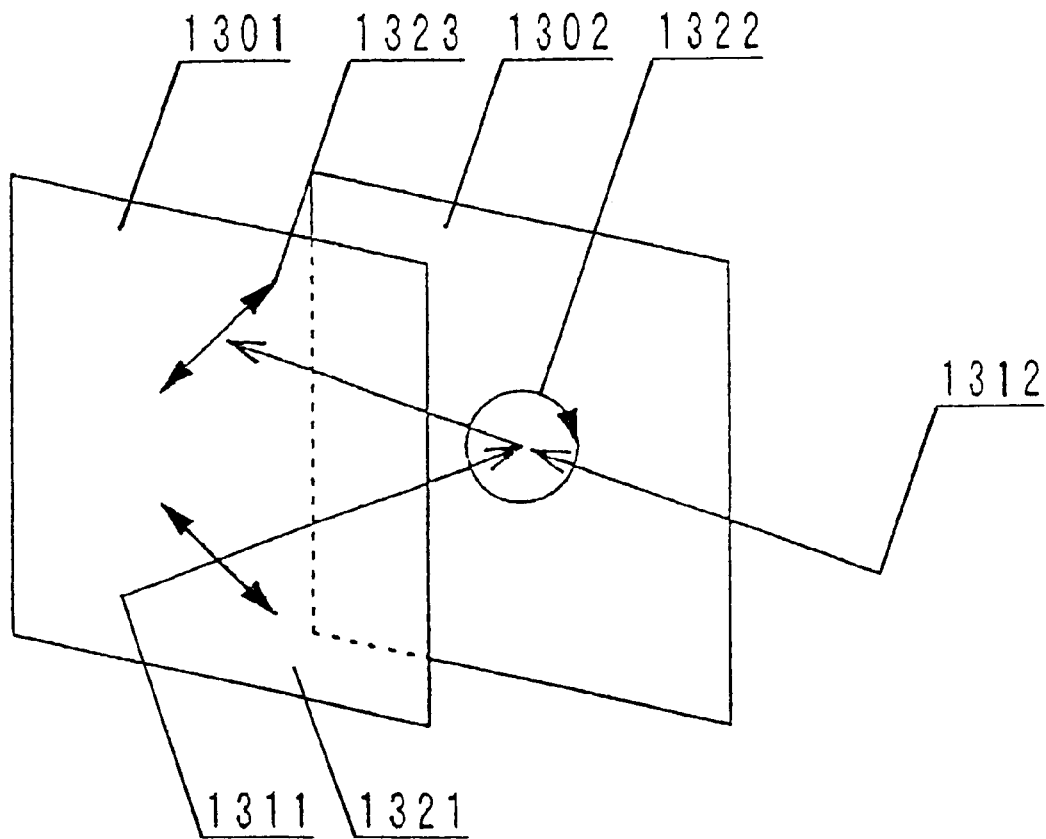
FIG. 13 is a drawing showing the display operation of the liquid crystal device in accordance with the first to sixth embodiments, and the changes in the polarization states of reflective display and transmissive display.

FIG. 11(c) shows a portable information apparatus comprising a display unit 1106 provided on the upper side of a body 1105, and an input unit 1107 provided on the lower side thereof. Such a conventional portable information apparatus frequently uses a reflective monochromatic liquid crystal device. This is because a transmissive color liquid crystal device consumes high electric power due to the continuous use of a back light, and thus cannot be continuously used for a long time. In this case, the use of the transflective liquid crystal device of the present invention permits a color display with low power consumption, and a bright display with the back light turned on in a dark environment, thereby obtaining an advantageous portable information apparatus.

INDUSTRIAL APPLICABILITY

The liquid crystal device of the present invention can be used as various display devices capable of displaying an image with high contrast in both the dark and the light, and can be used as a liquid crystal device which constitutes the display units of various electronic apparatus. The electronic apparatuses in accordance with the present invention can be used as a liquid crystal television, a view finder type or monitor direct viewing type video tape recorder, a car navigator, an electronic notebook, a table calculator, a word processor, a work station, a portable telephone, a picture telephone, a POS terminal, a touch panel, or the like, which comprises the liquid crystal device of the present invention.

What is claimed is:

1. A liquid crystal device having a reflective display function by reflecting light incident on a liquid crystal layer from one side thereof by a transflective layer, and a transmissive display function by transmitting light incident from another side of the liquid crystal layer opposite to the one side;

wherein said liquid crystal device has a bright display state as a first display state and a dark display state as a second display state, which can be respectively selected by changing a voltage applied to the liquid crystal layer; and in the second display state, the light incident on the liquid crystal layer from the one side passes through the liquid crystal layer and is reflected by the transflective layer to be changed to circularly polarized light or elliptically polarized light with a predetermined rotational direction;

the liquid crystal device comprising:
a first polarizer arranged on the one side;
an optical element provided on the other side, for changing light incident on the transflective layer from the other side to polarized light with the predetermined rotational direction;
wherein the rotational direction of the circularly polarized light or the elliptically polarized light resulting from the light incident through the optical element on the transflective layer from the other side is the same as that of the circularly polarized light or the elliptically polarized light resulting from the light reflected by the transflective layer in the second display state.

2. A liquid crystal device according to claim 1, wherein the second display state of the liquid crystal layer provides an ellipticity of reflected light incident on the liquid crystal layer from the one side by the transflective layer, the ellipticity being the same as that of transmitted light incident on the liquid crystal layer from the other side through the transflective layer.

3. A liquid crystal device according to claim 1, wherein a medium brightness display state as a third display state that is between the first and second states can be selected by changing the voltage applied to the liquid crystal layer.

4. A liquid crystal device according to claim 1, wherein in the second display state, the light incident on the liquid crystal layer from the one side is reflected by the transflective layer to be changed to circularly polarized light with the predetermined rotational direction; and in the first display state, the light incident on the liquid crystal layer from the one side is reflected by the transflective layer to be changed to linearly polarized light.

5. A liquid crystal device according to claim 1, wherein the optical element comprises a second polarizer provided on the other side, and a retardation plate provided between the second polarizer and the liquid crystal layer.

6. A liquid crystal device according to claim 5, wherein the transmission axis of the second polarizer, and the axis and retardation value of the retardation plate are set so that when the light incident on the liquid crystal layer from the other side is transmitted through the transflective layer, ellipticity is at least 0.85.

7. A liquid crystal device according to claim 5, wherein the retardation plate comprises a 1/4 wavelength plate.

8. A liquid crystal device according to claim 1, wherein the optical element comprises a reflective polarizer provided on the other side, and a retardation plate provided between the reflective polarizer and the liquid crystal layer.

9. A liquid crystal device according to claim 8, wherein the transmission axis of the reflective polarizer, and the axis and retardation value of the retardation plate are set so that when the light incident on the liquid crystal layer from the other side is transmitted through the transflective layer, ellipticity is 0.85 or more.

10. A liquid crystal device according to claim 8, wherein the retardation plate comprises a 1/4 wavelength plate.

11. A liquid crystal device according to claim 1, wherein the optical element comprises a liquid crystal polymer exhibiting a cholesteric phase.

12. A liquid crystal device according to claim 1, further comprising an illumination device arranged on a first side of the optical element opposite to a second side of the optical element, the second side of the optical element being adjacent the liquid crystal layer.

13. A liquid crystal device comprising:
a liquid crystal cell having a liquid crystal layer between a first substrate and a second substrate opposed thereto;
a transflective layer arranged on a first side of the second substrate that is between the liquid crystal layer and the second substrate, for reflecting and transmitting incident light with predetermined reflectance and transmittance;
an illumination device arranged on a second side of the second substrate opposite the first side of the second substrate;
one of a polarizer or reflective polarizer arranged between the liquid crystal cell and the illumination device; and
a retardation plate arranged between the polarizer or reflective polarizer, and the liquid crystal cell, for changing linearly polarized light produced by passing the light, emitted from the illumination device, through the polarizer or reflective polarizer to circularly polarized light or elliptically polarized light;
wherein light emitted from the illumination device passes through the retardation plate, the retardation plate providing a circularly polarized light or elliptically polarized light that has the same rotational direction as that of polarized light produced when light incident from a direction of the first substrate in a dark display state is reflected by the transflective layer.

14. A liquid crystal device according to claim 13, wherein the transmission axis of the polarizer or reflective polarizer, and the axis and retardation value of the retardation plate are set so that when the light emitted from the illumination device is transmitted through the retardation plate, ellipticity is at least 0.85.

15. A liquid crystal device according to claim 14, wherein the retardation plate comprises at least a 1/4 wavelength plate.

16. A liquid crystal device comprising:
a liquid crystal cell having a liquid crystal layer between a first substrate and a second substrate opposed thereto;
a transflective layer arranged on a side of the second substrate facing the liquid crystal layer, for reflecting and transmitting incident light with predetermined reflectance and transmittance;
an illumination device arranged on another side of the second substrate different from the side facing the liquid crystal layer; and
a selective reflecting layer arranged between the liquid crystal cell and the illumination device, for selectively reflecting and transmitting circularly polarized light or elliptically polarized light according to its rotational direction;
wherein light emitted from the illumination device is transmitted through the selective reflecting layer of the liquid crystal cell, the selective reflecting layer providing a circularly polarized light or elliptically polarized light that has the same rotational direction as that of circularly polarized light or elliptically polarized light produced when light incident from the first substrate in the dark display state is reflected by the transflective layer.

17. A liquid crystal device according to claim 16, wherein selective reflection of a cholesteric liquid crystal is utilized for the selective reflecting layer.

18. An electronic apparatus comprising a liquid crystal device as a display unit, wherein a liquid crystal device according to claim 16 is provided.

19. A transflective liquid crystal device comprising:
a liquid crystal layer disposed between first and second substrates;
a polarizer formed on the first substrate for absorbing a predetermined linearly polarized light;
an optical element formed on the second substrate for changing incident light to linearly polarized light with a predetermined rotational direction;
a transflective layer disposed between the liquid crystal layer and the second substrate for reflecting and transmitting incident light with predetermined reflectance and transmittance values to perform reflective and transmissive functions;
wherein the transflective layer reflects the light incident from the first substrate for the reflective function, and transmits the light incident on the second substrate for the transmissive function;
wherein the device selects the display state between bright and dark display states depending on an applied voltage; and
wherein the rotational direction of circularly polarized light or elliptically polarized light resulting from the light incident through the optical element, which is on the transflective layer, from the first substrate is the same as that of the circularly polarized light or the elliptically polarized light resulting from the light reflected by the transflective layer in the second display state.

20. The device of claim 19 further comprising an illumination device formed on a side of the second substrate opposite to the liquid crystal layer for emitting light incident from the second substrate on the transflective layer, thereby permitting transmissive display function in the dark display state.

21. The device of claim 19 wherein the transflective layer reflects the linearly polarized light incident on the liquid crystal layer from the first substrate to linearly polarized light in the bright display state thereby emitting an image light.

22. The device of claim 19 wherein the transflective layer reflects the light incident on the liquid crystal layer from the first substrate to elliptically polarized light with the predetermined rotational direction in the dark display state.

23. The device of claim 22 wherein the transflective layer transmits the linearly polarized light from the optical element, which is originally incident on the liquid crystal layer from the second substrate in the dark display state.

24. The device of claim 22 wherein the reflected light and transmitted light by the transflective layer have the same rotational direction, thereby preventing a contrast of the transmissive function from being decreased in the dark display state.

25. The device of claim 19 wherein the optical element comprises a second polarizer and a retardation plate.

26. The device of claim 19 wherein the optical element comprises a selective reflecting layer which uses selective reflection of a cholesteric liquid crystal.

* * * * *